United States Patent
Brown et al.

(10) Patent No.: US 11,604,590 B2
(45) Date of Patent: Mar. 14, 2023

(54) METADATA TRACK ENTRY SORTING IN A DATA STORAGE SYSTEM

(71) Applicant: International Business Machines Corporation, Armonk, NY (US)

(72) Inventors: Theresa M. Brown, Tucson, AZ (US); David Fei, Tucson, AZ (US); Gregory E. McBride, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 613 days.

(21) Appl. No.: 16/123,445

(22) Filed: Sep. 6, 2018

(65) Prior Publication Data

US 2020/0081642 A1    Mar. 12, 2020

(51) Int. Cl.
*G06F 3/06*     (2006.01)
*G06F 11/14*    (2006.01)

(52) U.S. Cl.
CPC .......... *G06F 3/0638* (2013.01); *G06F 3/0604* (2013.01); *G06F 3/0629* (2013.01); *G06F 3/0671* (2013.01); *G06F 11/1448* (2013.01)

(58) Field of Classification Search
CPC .......... G06F 3/06; G06F 11/14; G06F 3/0638; G06F 3/0604; G06F 3/0629; G06F 3/0671; G06F 11/1448; G06F 2201/84; G06F 11/2064; G06F 11/2071; G06F 11/1446; G06F 3/065
See application file for complete search history.

(56) References Cited

U.S. PATENT DOCUMENTS

| 5,504,861 A | * | 4/1996 | Crockett | G06F 11/1435 714/13 |
| 5,615,329 A | * | 3/1997 | Kern | G06F 11/2064 714/6.12 |
| 6,502,174 B1 | * | 12/2002 | Beardsley | G06F 12/0866 707/999.202 |

(Continued)

OTHER PUBLICATIONS

Stroustrup, Bjorn, Programming Principles and Practices Using C++, Second Edition. Addison-Wesley, Upper Saddle River, NJ (2014) (Year: 2014).*

(Continued)

*Primary Examiner* — Michael Krofcheck
(74) *Attorney, Agent, or Firm* — Konrad Raynes Davda & Victor LLP; William K. Konrad

(57) ABSTRACT

In one aspect of metadata track entry sorting in accordance with the present description, recovery logic sorts a list of metadata entries as a function of a source data track identification of each metadata entry to provide a second, sorted list of metadata entries, and generates a recovery volume which includes data tracks which are a function of one or more data target tracks identified by the sorted list of metadata entries. Because the metadata entry contents of the sorted list have been sorted as a function of source track identification number, the particular time version of a particular source track may be identified more quickly and more efficiently. As a result, recovery from data loss may be achieved more quickly and more efficiently thereby providing a significant improvement in computer technology. Other features and aspects may be realized, depending upon the particular application.

24 Claims, 11 Drawing Sheets

(56) References Cited

U.S. PATENT DOCUMENTS

| | | | |
|---|---|---|---|
| 6,567,888 B2 | 5/2003 | Kedem | |
| 6,611,901 B1* | 8/2003 | Micka | G06F 3/0614 |
| | | | 711/113 |
| 7,062,541 B1* | 6/2006 | Cannon | G06F 3/0647 |
| | | | 709/219 |
| 7,543,110 B2 | 6/2009 | Stolowitz | |
| 8,010,495 B1 | 8/2011 | Kuznetzov et al. | |
| 8,055,938 B1 | 11/2011 | Chatterjee et al. | |
| 8,533,397 B2 | 9/2013 | Bar-El et al. | |
| 8,549,225 B2 | 10/2013 | Blinick et al. | |
| 8,713,272 B2 | 4/2014 | Agombar et al. | |
| 8,850,106 B2 | 9/2014 | Benhase et al. | |
| 8,938,428 B1 | 1/2015 | Ozekinci et al. | |
| 9,471,499 B2 | 10/2016 | Brown et al. | |
| 9,558,072 B1 | 1/2017 | Mam | |
| 9,600,375 B2 | 3/2017 | Dain et al. | |
| 9,600,377 B1 | 3/2017 | Cohen et al. | |
| 9,626,115 B2 | 4/2017 | Dain et al. | |
| 9,658,798 B2 | 5/2017 | Ash et al. | |
| 9,733,862 B1 | 8/2017 | Klemm et al. | |
| 9,817,724 B2 | 11/2017 | Dain et al. | |
| 9,852,198 B1 | 12/2017 | Kuznetzov et al. | |
| 9,857,962 B2 | 1/2018 | Yui et al. | |
| 9,857,996 B2 | 1/2018 | Wilkinson | |
| 9,891,860 B1* | 2/2018 | Delgado | G06F 3/0614 |
| 9,927,980 B1 | 3/2018 | LeCrone et al. | |
| 10,013,361 B2 | 7/2018 | Mannenbach et al. | |
| 2004/0260896 A1* | 12/2004 | Werner | G06F 11/2076 |
| | | | 711/162 |
| 2005/0071372 A1 | 3/2005 | Bartfai et al. | |
| 2005/0171979 A1 | 8/2005 | Stager et al. | |
| 2005/0172097 A1* | 8/2005 | Voigt | G06F 3/0613 |
| | | | 711/170 |
| 2006/0106891 A1 | 5/2006 | Mahar et al. | |
| 2007/0226437 A1* | 9/2007 | McClure | G06F 11/2058 |
| | | | 711/162 |
| 2008/0155216 A1 | 6/2008 | Shoham | |
| 2008/0222377 A1 | 9/2008 | Wightwick et al. | |
| 2014/0108756 A1 | 4/2014 | Brown et al. | |
| 2014/0344526 A1 | 11/2014 | Brown et al. | |
| 2015/0081628 A1 | 3/2015 | Brown et al. | |
| 2015/0261678 A1 | 9/2015 | Gupta et al. | |
| 2015/0286424 A1 | 10/2015 | Dain et al. | |
| 2015/0286432 A1 | 10/2015 | Dain et al. | |
| 2015/0286542 A1 | 10/2015 | Dain et al. | |
| 2016/0232102 A1 | 8/2016 | Ash et al. | |
| 2016/0253121 A1 | 9/2016 | Guo et al. | |
| 2016/0259574 A1 | 9/2016 | Carpenter et al. | |
| 2016/0291890 A1 | 10/2016 | Jennas et al. | |
| 2017/0153950 A1 | 6/2017 | Iwasaki et al. | |
| 2017/0161153 A1 | 6/2017 | Dain et al. | |
| 2017/0177443 A1 | 6/2017 | Figueroa et al. | |
| 2018/0136874 A1 | 5/2018 | Karve et al. | |
| 2018/0150229 A1 | 5/2018 | Brown et al. | |

OTHER PUBLICATIONS

U.S. Appl. No. 16/123,412, filed Sep. 6, 2018.
U.S. Appl. No. 16/123,457, filed Sep. 6, 2018.
U.S. Appl. No. 16/123,674, filed Sep. 6, 2018.
U.S. Appl. No. 16/123,771, filed Sep. 6, 2018.
U.S. Appl. No. 16/123,445, filed Sep. 6, 2018.
U.S. Appl. No. 16/123,660, filed Sep. 6, 2018.
U.S. Appl. No. 16/123,486, filed Sep. 6, 2018.
U.S. Appl. No. 15/611,569, filed Jun. 1, 2017.
U.S. Appl. No. 15/663,727, filed Jul. 29, 2017.
U.S. Appl. No. 15/828,288, filed Nov. 30, 2017.
U.S. Appl. No. 15/828,302, filed Nov. 30, 2017.
Azagury et al.; "Point-In-Time Copy: Yesterday, Today And Tomorrow", IBM Storage Systems Group, 2002, pp. 259-270.
Anonymous, "Data Aware Optimized Backups—Object & System Level", dated Jun. 2, 2016, An IP.com Prior Art Database Technical Disclosure, IPCOM000246384D, Total 7 pages.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pages.
Dufrasne et al., "IBM DS8880 Architecture and Implementation (Release 8.3)", IBM, Nov. 2017, Total 510 pp.
Emc et al.; "Introduction To XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pages.
Lim, S. et al., "Efficient Journaling Writeback Schemes for Reliable and High-Performance Storage Systems", Pers Ubiquit Comput, 17, 2013, 14 pp.
Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grange, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Taylor, Chris; "Effective Backups: Selecting The Right Backup Mechanism To Match The Business Requirement", Session 16273, pp. 1-62, 2014.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
U.S. Appl. No. 16/123,635, filed Sep. 6, 2018.
U.S. Appl. No. 16/123,618, filed Sep. 6, 2018.
Well, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Well, P. and T. Grange, "The NIST Definition of Cloud Computing (Draft)", Sep. 2011, Computer Security Division Information Technology Laboratory National Institute of Standards and Technology, Total 7 pp.

* cited by examiner

| UPDATE ACTIVITY | | BACKUP VOLUME | | CONSISTENCY GROUP | METADATA | | | |
|---|---|---|---|---|---|---|---|---|
| | | | | | METADATA ENTRY OF METADATA TRACK MT1 | METADATA ENTRY CONTENTS | | |
| SOURCE TRACK | UPDATED | BACKUP VOLUME TRACK | BACKUP VOLUME CONTENTS | | | SOURCE TRACK | BACKUP VOLUME TRACK | LINK POINTER |
| SVT100 | 1:15 PM | BVT1 | SVT100 | CG1 | ME1 | SVT100 | BVT1 | ME2 |
| SVT50 | 1:20 PM | BVT2 | SVT50 | CG1 | ME2 | SVT50 | BVT2 | ME3 |
| SVT400 | 1:50 PM | BVT3 | SVT400 | CG1 | ME3 | SVT400 | BVT3 | ME4 |
| SVT30 | 2:15 PM | BVT4 | SVT30 | CG2 | ME4 | SVT30 | BVT4 | ME5 |
| SVT55 | 2:20 PM | BVT5 | SVT55 | CG2 | ME5 | SVT55 | BVT5 | ME6 |
| SVT40 | 2:30 PM | BVT6 | SVT40 | CG2 | ME6 | SVT40 | BVT6 | ME7 |
| SVT100 | 2:45 PM | BVT7 | SVT100 | CG3 | ME7 | SVT100 | BVT7 | ME8 |
| SVT50 | 3:20 PM | BVT8 | SVT50 | CG3 | ME8 | SVT50 | BVT8 | ME9 |
| SVT299 | 3:40 PM | BVT9 | SVT299 | CG3 | ME9 | SVT299 | BVT9 | ME10 |
| SVT100 | 3:55 PM | BVT10 | SVT100 | CG3 | ME10 | SVT100 | BVT10 | ---- |

FIG. 6A

| UPDATE ACTIVITY | | BACKUP VOLUME | | CONSISTENCY GROUP | METADATA | | | |
|---|---|---|---|---|---|---|---|---|
| SOURCE TRACK | UPDATED | BACKUP VOLUME TRACK | BACKUP VOLUME CONTENTS | | METADATA ENTRY | METADATA ENTRY CONTENTS | | |
| | | | | | | SOURCE TRACK | BACKUP VOLUME TRACK | LINK POINTER |
| SVT100 | 1:15 PM | BVT1 | SVT100 | CG1 | ME1 | SVT100 | BVT1 | ME3 |
| SVT50 | 1:20 PM | BVT2 | SVT50 | CG1 | ME2 (START) | SVT50 | BVT2 | ME1 |
| SVT400 | 1:50 PM | BVT3 | SVT400 | CG1 | ME3 | SVT400 | BVT3 | ME4 |
| SVT30 | 2:15 PM | BVT4 | SVT30 | CG2 | ME4 | SVT30 | BVT4 | ME6 |
| SVT55 | 2:20 PM | BVT5 | SVT55 | CG2 | ME5 | SVT55 | BVT5 | ME7 |
| SVT40 | 2:30 PM | BVT6 | SVT40 | CG2 | ME6 | SVT40 | BVT6 | ME5 |
| SVT100 | 2:45 PM | BVT7 | SVT100 | CG2 | ME7 | SVT100 | BVT7 | ME8 |
| SVT50 | 3:20 PM | BVT8 | SVT50 | CG3 | ME8 | SVT50 | BVT8 | ME10 |
| SVT299 | 3:40 PM | BVT9 | SVT299 | CG3 | ME9 | SVT299 | BVT9 | ---- |
| SVT100 | 3:55 PM | BVT10 | SVT100 | CG3 | ME10 | SVT100 | BVT10 | ME9 |

FIG. 6B

| CONSISTENCY GROUP | METADATA ENTRY | SORTED METADATA ENTRY CONTENT LIST 119a | |
|---|---|---|---|
| | | METADATA ENTRY CONTENTS | |
| | | SOURCE TRACK | BACKUP VOLUME TRACK |
| CG1 | ME2 | SVT50 | BVT2 |
| CG1 | ME1 | SVT100 | BVT1 |
| CG1 | ME3 | SVT400 | BVT3 |
| CG2 | ME4 | SVT30 | BVT4 |
| CG2 | ME6 | SVT40 | BVT6 |
| CG2 | ME5 | SVT55 | BVT5 |
| CG2 | ME7 | SVT100 | BVT7 |
| CG3 | ME8 | SVT50 | BVT8 |
| CG3 | ME10 | SVT100 | BVT10 |
| CG3 | ME9 | SVT299 | BVT9 |

FIG. 7A

| METADATA ENTRY | SORTED METADATA ENTRY CONTENT LIST 119a FOR CONSISTENCY GROUP CG2 | |
|---|---|---|
| | METADATA ENTRY CONTENTS | |
| | SOURCE TRACK | BACKUP VOLUME TRACK |
| ME4 | SVT30 | BVT4 |
| ME6 | SVT40 | BVT6 |
| ME8 | SVT50 | BVT8 |
| ME5 | SVT55 | BVT5 |
| ME7 | SVT100 | BVT7 |
| ME9 | SVT299 | BVT9 |

FIG. 7B

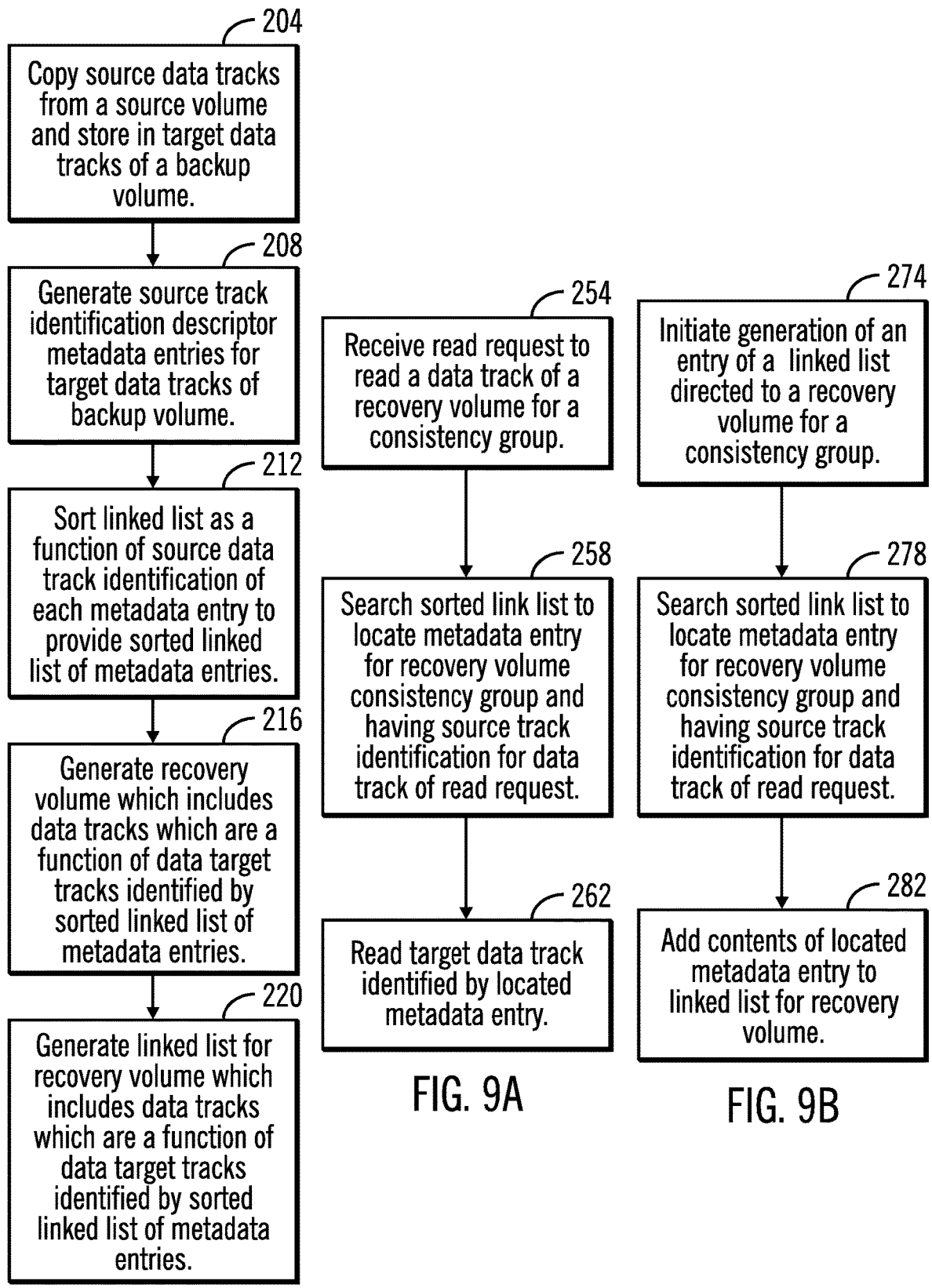

METADATA TRACK ENTRY SORTING IN A DATA STORAGE SYSTEM

BACKGROUND OF THE INVENTION

1. Field of the Invention

The present invention relates to a computer program product, system, and method for metadata track entry sorting in data storage systems.

2. Description of the Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship. Primary and secondary storage controllers may be used to control access to the primary and secondary storage devices.

Depending upon the distance between primary and secondary storage systems, data may be synchronously or asynchronously copied from the primary storage site to the secondary storage site. Data may be copied in consistency groups, such that the second copy at the secondary site is consistent as of a point-in-time to a first copy of the data at the primary site. In a consistency group, the order of dependent writes is preserved in the copying of the data.

The second copy, at the secondary site, may be copied to a target or backup copy of the data at the secondary site using point-in-time ("PiT") copy techniques, such as the IBM FlashCopy® (FlashCopy is a registered trademark of IBM). In this way the second copy at the secondary site becomes the source data for the PiT copy to the backup copy which is typically on the same storage as the second copy.

In a PiT copy, the source data need not be physically copied from the source volume to the backup volume as long as the source data as it existed at the particular point-in-time still remains on the source volume. Instead, for each track of the backup volume, metadata may point to the particular source track of the source volume where the source data may be obtained if needed such in a read operation directed to the track of the backup volume. However, if the source data of a particular source track will be overwritten by an update operation directed to the source track, the source data of the source track is copied to the corresponding target track of the backup volume before the source track is overwritten with the update data.

Another copy technique referred to herein as a multi-point-in-time (MPiT) copy technique provides a copy of a source volume which spans multiple consistency groups. An example of an MPiT copy technique is the IBM Safeguarded Copy function. An MPiT copy function typically relies on metadata to provide information on where in the MPiT backup volume, a particular time version of a particular track of the source volume of the MPiT copy function resides. This metadata is referred to herein as Source Track ID Descriptor or STIDD. Within the STIDD metadata are multiple metadata tracks, and within each metadata track are multiple STIDD entries, each of which points to the location in a backup volume of a particular time version of a particular source track.

When tracks are copied from the MPiT Source to the MPiT Backup Volume, typically because a source track is being updated, STIDD entries are typically created in cache for each track being copied before the source track is overwritten by the update. Because the cache is typically a volatile memory, the STIDD entries in cache may be lost in the event of a power loss or hardware or software failure. Accordingly, the MPiT copy may not be deemed to be complete until all STIDD metadata entries are safely destaged to nonvolatile storage.

Once the MPiT copy function is complete, a recovery volume may be created to view or update a particular time version of the source volume of the MPiT copy function. A time version of the source volume is frequently referred to as being in a consistency group such that the recovery volume is consistent as of a particular point in-time to the source volume of the MPiT copy function. The actual data of a particular time version of the source volume may not reside on the recovery volume but instead may be located on tracks of the backup volume or the source volume itself.

To locate a particular time version of a source track which has been copied to the backup volume, the metadata is searched to locate a metadata entry for particular source track which was generated for the particular time version of the particular source track. The metadata entries are typically stored in chronological order in the metadata tracks in the time order in which the source tracks identified by the metadata entries have been copied to the backup volume prior to being overwritten by update operations.

If a metadata entry for the desired time version of the source track is found, that metadata entry may be used to identify the track of the backup volume to which the particular time version of the source track was copied. The data may then be read from the identified backup volume track. If a metadata entry for the source track is not found, the data for the source track still resides on the source track and may be read from the source track. It is appreciated that locating a metadata entry for a particular time version of a source track is a time consuming process, which can adversely affect system performance.

SUMMARY

Metadata track entry sorting in accordance with the present description, provides a significant improvement in computer technology. For example, recovery from data loss may be achieved more quickly and more efficiently. In one aspect of the present description, recovery logic sorts the contents of the metadata track entries of a metadata track as a function of source track identification number to provide a sorted list of contents of metadata track entries, to permit the time version of a source track to be located more quickly and more efficiently in a search of metadata tracks, and to speed the recovery process.

One embodiment of the present description is directed to a computer system copying a plurality of source data tracks from a source volume and storing the plurality of copied data tracks in a plurality of target data tracks of a backup volume. A first list of source track identification descriptor (STIDD) metadata entries are generated for the plurality of copied source data tracks stored in the plurality of target data tracks of the backup volume. Each metadata entry identifies a source data track copied from the source volume and an associated target data track of the backup volume in which the source data track is stored.

In one aspect of metadata track entry sorting in accordance with the present description, recovery logic sorts the first list of metadata entries as a function of a source data track identification of each metadata entry to provide a second, sorted list of metadata entries, and generates a recovery volume which includes data tracks which are a function of one or more data target tracks identified by the sorted list of metadata entries. Because the metadata entry contents of the sorted list have been sorted as a function of source track identification number, the particular time version of a particular source track may be identified more quickly and more efficiently. As a result, recovery from data loss may be achieved more quickly and more efficiently thereby providing a significant improvement in computer technology.

In one embodiment, the first list of metadata entries includes a consistency group identification of a consistency group to which a source data track and its associated target data track of each metadata entry belongs. In such an embodiment, the sorting of the first list of metadata entries may include sorting the first list of metadata entries as a function of a source data track identification within each consistency group identification. As a result, it may be determined by search logic without examining contents of all metadata track entries of a consistency group whether the metadata track entry for a particular source track identification number is present in the metadata track entries of that consistency group. Thus, a search by recovery logic can bypass the remaining entries of the consistency group and skip to the next consistency group. In a commercial environment in which metadata tracks may contain thousands of entries, metadata track entry sorting in accordance with the present description may permit thousands of entries to be skipped in a search, significantly speeding the results of the search and any recovery process dependent upon locating particular source tracks stored in a backup volume.

One embodiment of metadata track entry sorting in accordance with the present description is directed to a computer system generating a first recovery volume for a first consistency group having an associated first point-in-time value representing the source volume as of the first point-in-time value, and reading from the first recovery volume a first data track representing a first recovered source data track having a first source data track identification. The reading the first data track includes locating a metadata entry of the sorted list having the first source data track identification for the first point-in-time value and reading the target data track identified by the located metadata entry having the first source data track identification for the first point-in-time value. In one aspect of the present description, locating a metadata entry of the sorted list having the first source data track identification for the first point-in-time value includes locating a metadata entry of the sorted list having the first source data track identification and within a consistency group having the earliest associated point-in-time which matches or is later than the first point-in-time value for the first source data track identification. Metadata entries having a later source track identification number may be skipped in a search, significantly speeding the results of the search and any recovery process dependent upon locating particular source tracks stored in a backup volume.

Another aspect of metadata track entry sorting in accordance with the present description is directed to a computer system generating a first linked list of metadata entries in which each entry has a pointer identifying the next entry of the linked list in a first sequence of entries. In one embodiment, sorting the first list of metadata entries as a function of a source data track identification within each consistency group identification includes modifying the pointers of the metadata entries of each consistency group so that each entry has a pointer identifying the next entry of the linked list in a second, sorted sequence of entries sorted by consistency group identification and by source data track identification within each consistency group identification. By modifying pointers of an existing linked list, the linked list may be sorted without changing the physical location of metadata track entries or generating additional data structures outside the metadata track.

In another aspect of metadata track entry sorting in accordance with the present description is directed to a computer system, the sorted second list of metadata entries may be further sorted as a function of a source data track identification of metadata entries and a particular point-in-time to provide a third, sorted list of metadata entries for a particular recovery volume limited to a particular point-in-time of a particular consistency group. In one embodiment, the sorting for the third, sorted list includes for each source track of the particular recovery volume having contents stored in the backup volume, locating a metadata entry of the second, sorted list having a particular source data track identification and within a consistency group having the earliest associated point-in-time which matches or is later than the particular point-in-time value for the particular recovery volume. Pointers of the located metadata entries for the source tracks of the particular recovery volume having contents stored in the backup volume may be modified so that each entry of the third, sorted list has a pointer identifying the next entry of the third, sorted list in a third, sorted sequence of entries limited to the particular point-in-time for the particular recovery volume and sorted by source data track identification for the particular point-in-time for the particular recovery volume. Here too, by modifying pointers of an existing sorted linked list, the linked list may be further sorted without changing the physical location of metadata track entries or generating additional data structures outside the metadata track.

Implementations of the described techniques may include hardware, a method or process, or computer software on a computer-accessible medium. Other features and aspects may be realized, depending upon the particular application.

BRIEF DESCRIPTION OF THE DRAWINGS

FIG. 6A is a table illustrating an example of operations generating the metadata track entries of the metadata entry track of FIG. 5A.

FIG. 6B is a table illustrating an example of the metadata entries of FIG. 6A which have been sorted by modifying link pointers as depicted in the example of FIG. 5B.

FIG. 7A is an example of a linked list for the metadata entries of the metadata track of FIG. 5B.

FIG. 7B is an example of a linked list for the metadata entries of the metadata track of FIG. 5C.

FIG. 8 is an example of operations of the storage controller of FIG. 3 employing metadata track entry sorting in accordance with one aspect of the present description.

FIGS. 9A and 9B are additional examples of operations of the storage controller of FIG. 3 employing metadata track entry sorting in accordance with one aspect of the present description.

DETAILED DESCRIPTION

Figure 1:
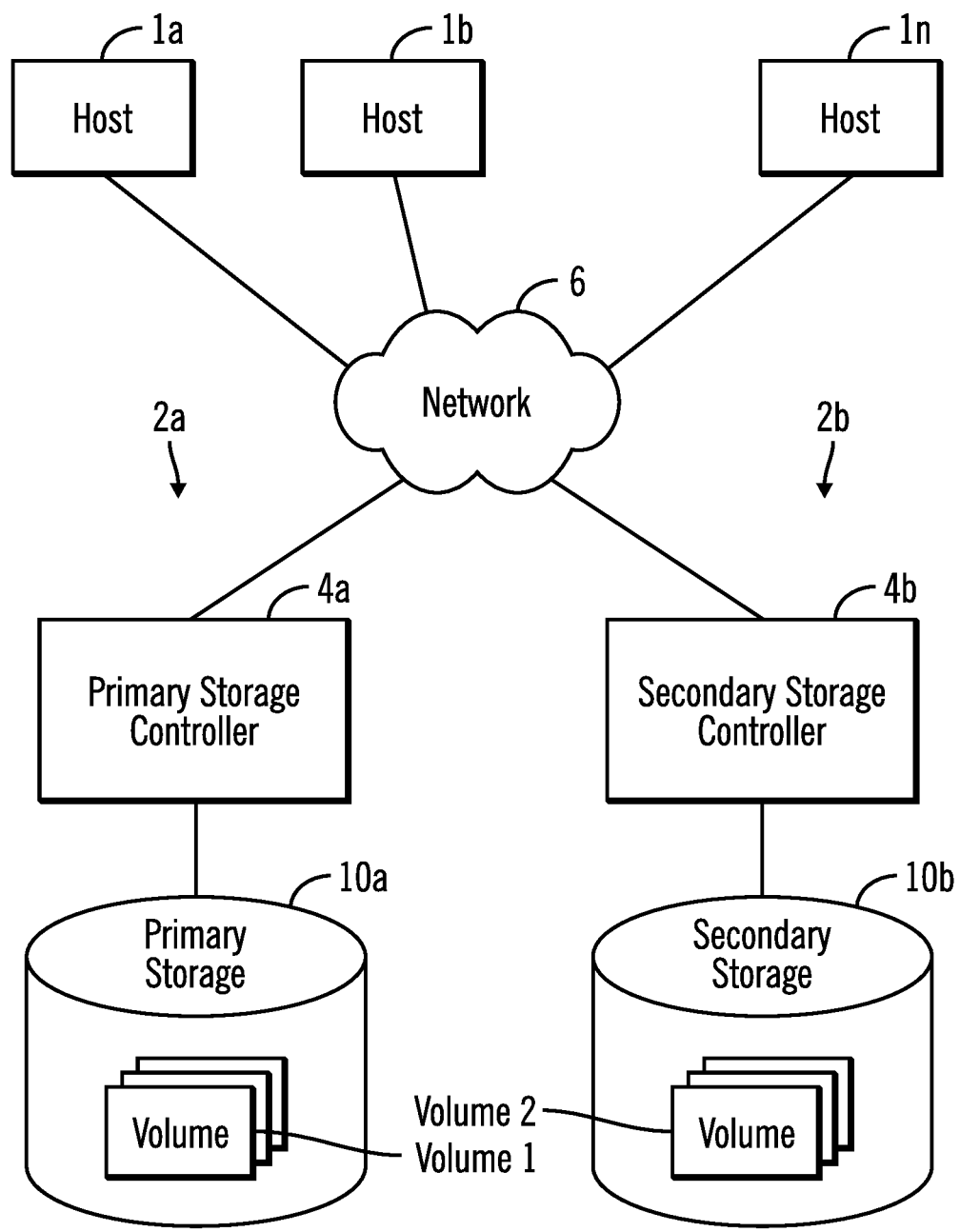
FIG. 1 illustrates an embodiment of a computing environment employing metadata track entry sorting in a data storage system in accordance with one aspect of the present description.

Metadata track entry sorting in accordance with the present description provides a significant improvement in computer technology. For example, it is appreciated that locating the particular backup volume track of a backup volume containing the particular time version of a particular source track of the source volume may be time consuming, particularly if the metadata entries of the metadata track are ordered using known sequence formats. Time is often a significant factor when data loss occurs and recovery processes are initiated to recover lost data from copies stored in backup volumes.

In one aspect of the present description, recovery logic sorts the contents of the metadata track entries of a metadata track as a function of source track identification number to provide a sorted list of contents of metadata track entries, to permit the time version of a source track to be located more quickly and more efficiently in a search of metadata tracks. For example, a sorted list of contents of the metadata track entries may be sorted by consistency group, and within each consistency group, by source track identification number. In one embodiment, the sorted list may be provided by modifying pointers linking the entries of the list in a sequence in which entries have been sorted as a function of source track identification numbers.

Because the metadata entry contents of the sorted list have been sorted as a function of source track identification number, the particular time version of a particular source track may be identified more quickly and more efficiently, thereby speeding a recovery of lost data, and providing a significant improvement in computer technology. For example, it may be determined by search logic without examining contents of all metadata track entries of a consistency group whether the metadata track entry for a particular source track identification number is present in the metadata track entries of that consistency group. As a result, a search by recovery logic can skip to the next consistency group, and examine contents of the metadata track entries of that consistency group. It is appreciated that metadata track entry sorting in accordance with the present description permits a metadata track entry for a particular source track identification number of a particular consistency group, to be located quickly and efficiently. In a commercial environment in which metadata tracks may contain thousands of entries, metadata track entry sorting in accordance with the present description may permit thousands of entries to be skipped in a search, significantly speeding the results of the search and the data recovery process.

In another aspect of the present description, another sorted list may be generated which is directed to a particular recovery volume for a particular consistency group, for example. Thus, if the recovery volume is directed to a single time version of source tracks, the list sorted as a function of source track identification number may be similarly limited to a single time version of the contents of source tracks stored in the backup volume of an MPiT relationship. Because the sorted list is limited to a single time version of the source tracks, a source track having that time version may be located more quickly as compared to a sorted list which contains all or at least multiple time versions of the source tracks stored in the backup volume.

In the illustrated embodiment, each metadata track is a linked list of metadata entries in which the entries are linked by pointers to form a sequence of metadata entries. The pointers of metadata entries located in a search for the source tracks of a particular recovery volume having contents stored in the backup volume, may be modified so that each entry of the sorted list has a pointer identifying the next entry of the list in a sorted sequence of entries limited to the particular point-in-time for the particular recovery volume and sorted by source data track identification for the particular point-in-time for the particular recovery volume. Here too, because the metadata entry contents of the sorted list have been sorted as a function of source track identification number, and are limited to a particular time version of source tracks, the particular time version of a particular source track may be identified more quickly and more efficiently, thereby providing a significant improvement in computer technology. By modifying pointers of an existing linked list, the linked list may be further sorted without changing the physical location of metadata track entries or generating additional data structures outside the metadata track.

Implementations of the described techniques may include hardware, a method or process, or computer software on a computer-accessible medium. A system of one or more computers may be configured for metadata track entry sorting in a data storage system in accordance with the present description, by virtue of having software, firmware, hardware, or a combination of them installed on the system that in operation causes or cause the system to perform metadata track entry sorting in accordance with the present description. For example, one or more computer programs may be configured to perform metadata track entry sorting in a data storage system by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIGS. 1-4 illustrate an embodiment of a computing environment employing metadata track entry sorting in a data storage system in accordance with the present description. A plurality of hosts 1a (FIGS. 1, 3), 1b . . . 1n may submit Input/Output (I/O) requests over a network 6 to one or more data storage devices or systems 2a, 2b, to read or write data. The hosts 1a, 1b . . . 1n may be separate physical devices or may be virtual devices implemented using assigned resources of partitions of a server, for example. In a similar manner, the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Figure 2:
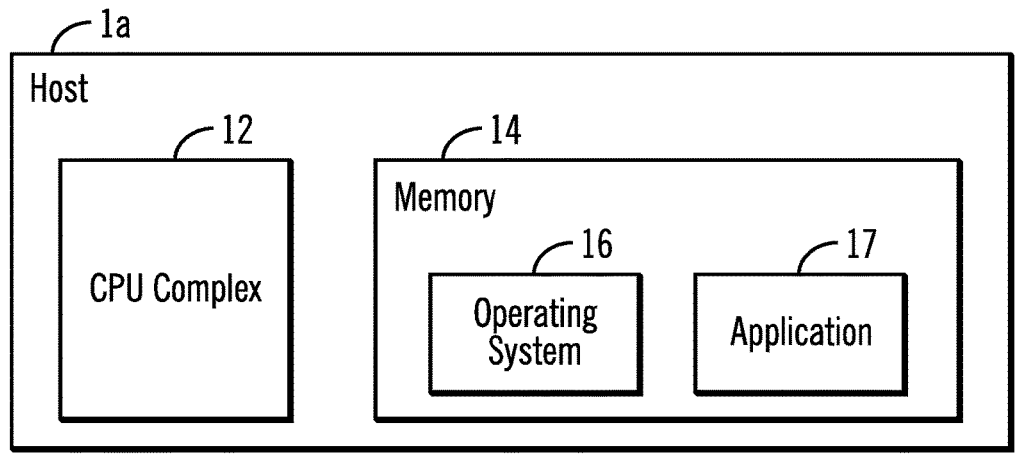
FIG. 2 illustrates an example of a host of the computing environment of FIG. 1.

A typical host as represented by the host 1a of FIG. 2 includes a CPU complex 12 and a memory 14 having an operating system 16 and an application 17 that cooperate to read data from and write data updates to the storage 10a, 10b via a storage controller 4a, 4b. An example of a suitable operating system is the z/OS operating system. It is appreciated that other types of operating systems may be employed, depending upon the particular application.

Figure 3:
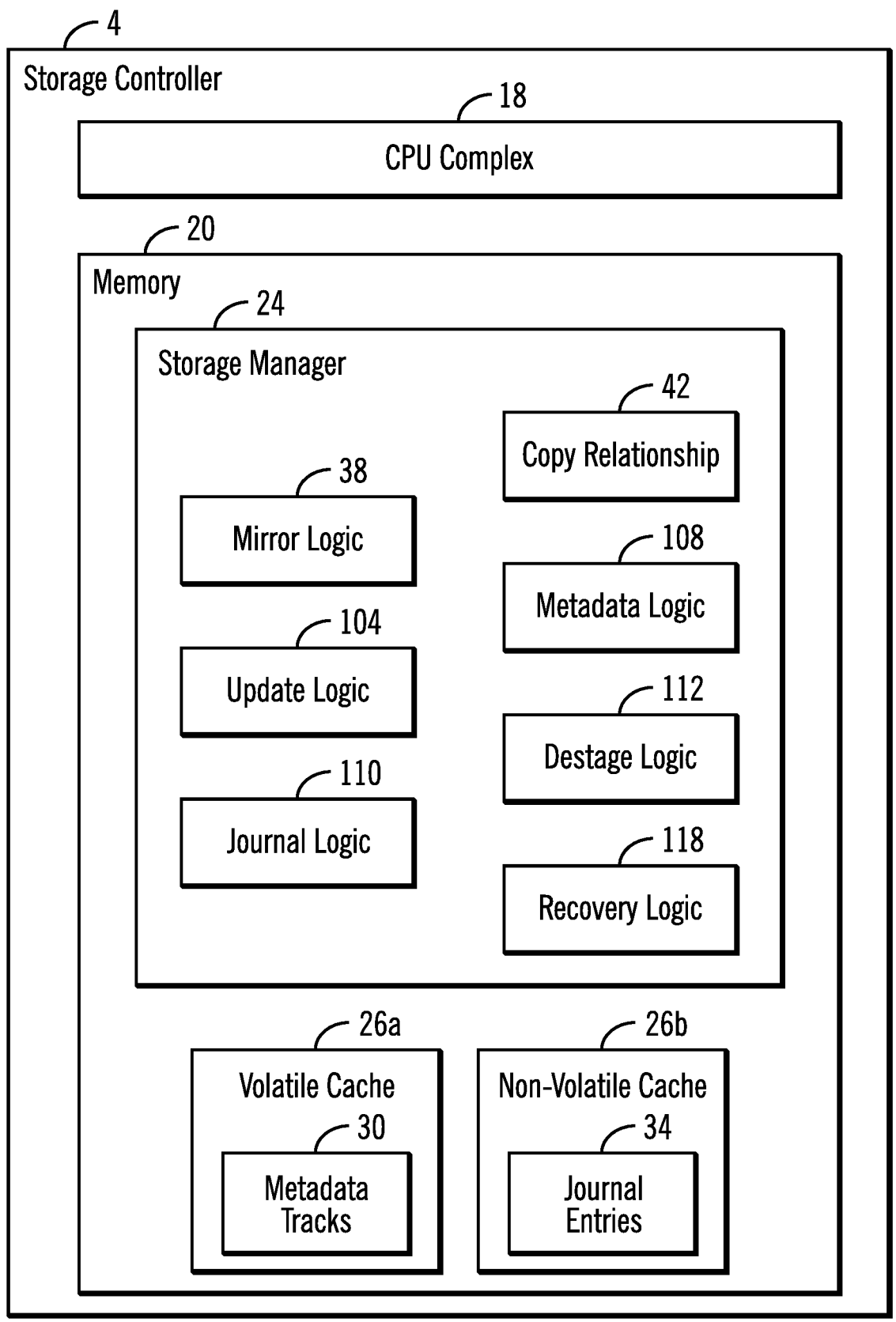
FIG. 3 illustrates an example of a storage controller of the computing environment of FIG. 1.

Each data storage system 2a, 2b includes a storage controller or control unit 4a, 4b, respectively, an example of which is shown in greater detail in FIG. 3 as storage controller 4, which accesses user data and metadata stored in multiple data storage units of storage 10a, 10b, respectively.

Each storage controller 4 (FIG. 3), 4a, 4b includes a CPU complex 18 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as CacheL1 and CacheL2 cache), for example. It is appreciated that a processor core may have other logic elements in addition to or instead of those mentioned herein.

Each storage controller 4 (FIG. 3), 4a, 4b further has a memory 20 that includes a storage manager 24 configured to manage storage operations including writing data to or reading data from a storage unit of an associated storage 10a, 10b in response to an I/O data request from a host or mirrored data from another data storage system. The storage manager 24 includes appropriate storage device drivers to configure associated storage 10a, 10b.

A cache comprising a volatile cache 26a, and a nonvolatile cache 26b of the memory 20 may comprise one or more of different types of memory, such as RAMs, write caches, read caches, non-volatile storage (NVS), etc. The different types of memory that comprise the cache may interoperate with each other. The CPU complex 18 of each storage controller 4 (FIG. 3), 4a, 4b may have multiple clusters of processors, each cluster having its own assigned memory 20, storage manager 24, cache, etc. The processing and memory resources assigned each cluster may be physical, virtual, shared, transferable or dedicated, depending upon the particular application. In one embodiment, metadata entries being generated may be placed in tracks 30 of the volatile cache 26a and journal entries 34 being generated may be journaled in the nonvolatile cache 26b.

In the illustrated embodiment, the storage manager 24 includes mirror logic 38 that is configured to execute in the primary storage controller 4a (FIG. 1) and perform copy operations to copy tracks or other portions of storage volumes from the primary storage controller 4a to the secondary storage controller 4b in a consistent manner. For example, a primary-secondary pair of volumes, volume1, volume2 are in an asynchronous copy or mirror relationship 42 such that updates to the primary volume1 are asynchronously mirrored to each secondary volume2.

In the illustrated embodiment, a copy relationship is represented by a data structure as represented by the copy relationships 42 of the memory 20 of FIG. 3. Thus, one or more copy relationships 42, which may be maintained by the mirror logic 38 for the primary and secondary storage controllers 4a, 4b, (FIG. 1) associate primary storage locations in the primary storage 10a and corresponding secondary storage locations in each of the secondary storage drives as represented by the storage 10b of the mirror relationship, such that updates to locations of the primary storage 10a are mirrored, that is, copied to the corresponding locations of the secondary storage 10b. For example, source storage locations in a primary storage volume1 (FIG. 1) of storage 10a may be asynchronously mirrored in a mirror operation to target storage locations of a secondary volume2 of the storage 10b pursuant to a mirror copy relationship 42 (FIG. 3). Similarly, source storage locations in the primary storage volume1 (FIG. 1) of storage 10a may be asynchronously mirrored in a mirror operation to additional target storage locations of another secondary volume2 of another secondary data storage system pursuant to a mirror copy relationship 42 (FIG. 3).

In the illustrated embodiment, a copy relationship of the copy relationships 42 comprises an asynchronous mirror relationship for a pair of storage locations in which updates to the primary (source) storage locations of the mirror relationship 42 are asynchronously mirrored to the secondary (target) storage locations of the mirror relationship 42. It is appreciated that other types of copy relationships such as synchronous, for example, may be established, depending upon the particular application.

Figure 4:
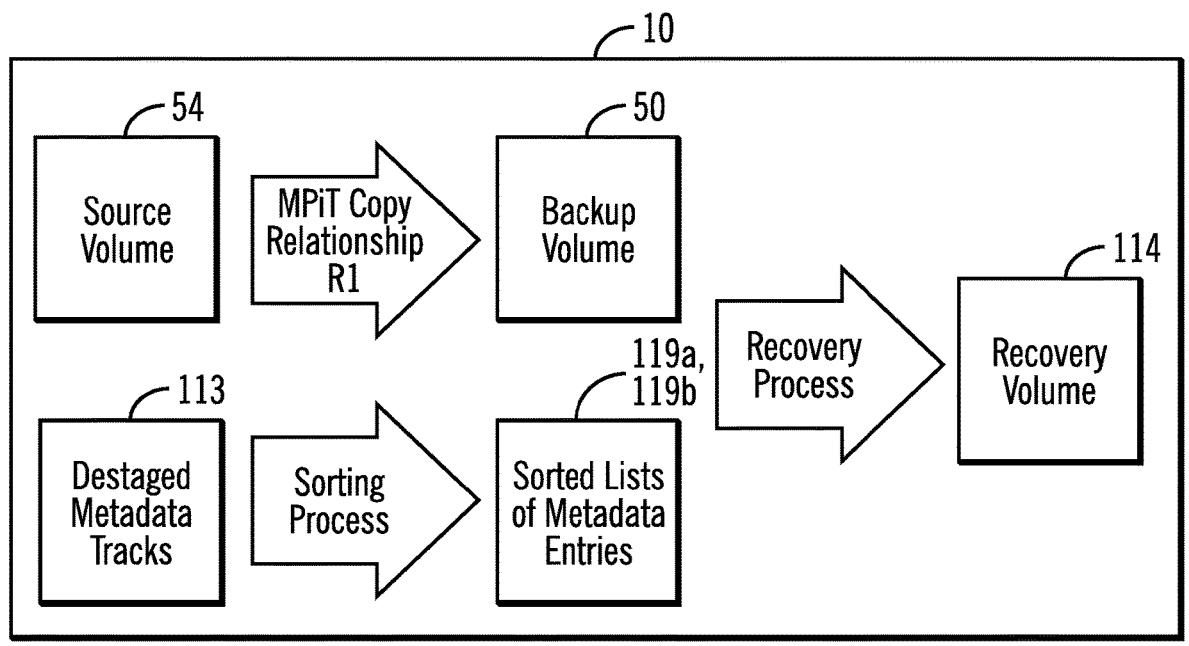
FIG. 4 illustrates an example of a data storage device of the computing environment of FIG. 1, employing metadata track entry sorting in accordance with one aspect of the present description.

In the illustrated embodiment, another copy relationship of the copy relationships 42 is a multi-point-in-time (MPiT) copy relationship. FIG. 4 depicts an example of an MPiT relationship R1 which provides in a backup volume 50 (FIG. 4) of storage 10, a copy of a source volume 54 which spans multiple consistency groups. A source volume 54 may be a primary volume such as the volume1 of the primary storage 10a, for example, or may be a secondary volume such as the volume2 of the secondary storage 10b, for example.

An example of an MPiT copy relationship is provided by the IBM Safeguarded Copy function, for example. An MPiT copy function typically relies on metadata to provide information on where in the MPiT backup volume 50, a particular time version of a particular track of the source volume 54 of the MPiT copy function resides. This metadata is referred to herein as Source Track ID Descriptor or STIDD. Within the STIDD metadata are multiple metadata tracks for the MPiT backup volumes, and within each metadata track are multiple STIDD entries, each of which points to the location in a backup volume of a particular time version of a particular source track.

In one embodiment of the storage manager 24, update logic 104 of the storage manager 24 is configured to, if a track of an MPiT source volume 54 is to be updated with new data, to first copy the source track to be updated, to the MPiT backup volume 50 of the MPiT copy relationship R1 before the source track is overwritten with the new data. In the illustrated embodiment, as the update logic 104 copies data tracks from the source volume 54 to the backup volume 50, the update logic 104 is further configured to cause a metadata logic 108 to generate a source track identification descriptor (STIDD) metadata entry for each copied track and place the generated metadata entries in a metadata track 30 in the volatile cache 26a.

Figure 5A:
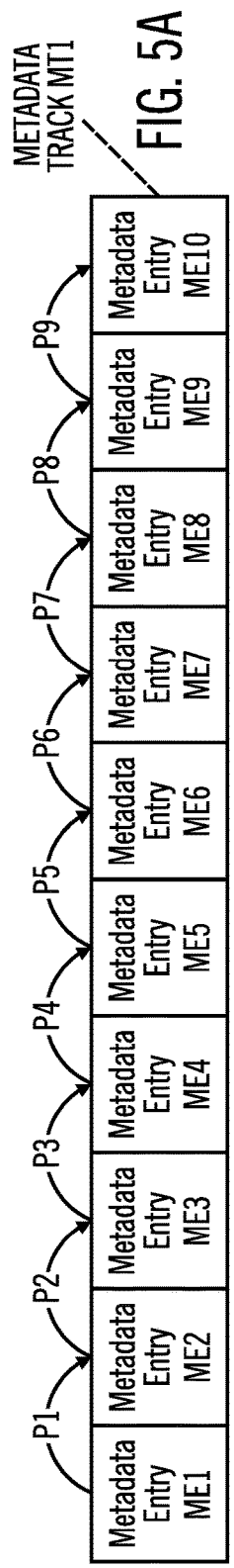
FIG. 5A illustrates an example of linked entries of a metadata track generated by the storage controller of FIG. 3.

FIG. 5A depicts an example of a metadata track MT1 in which ten metadata tracks ME1, ME2 . . . ME10 have been placed in response to the copying of ten source tracks at various times and in various consistency groups from the source volume 54 to the backup volume 50 of the MPiT copy relationship R1. Although the example of FIG. 5A depicts ten metadata entries in a metadata track for purposes of illustration, it is appreciated that a typical metadata track may have thousands or more such metadata track entries.

The metadata track MT1 is effectively a list of metadata entries of the metadata track. In one embodiment, each metadata entry is a data structure having multiple fields including a field which identifies by source track identification number, the source track of the source volume 54 to which it pertains and a field which identifies by target track identification number, the backup track of the backup volume 50 to which the source track was copied before it was updated. In the illustrated embodiment, each metadata track such as the metadata track MT1 of FIG. 5A, is a linked list of metadata entries in which the entries are linked by pointers P1-P9 to form a sequence of metadata entries. For example, a sequence of metadata entries of a track may initially be placed in the metadata track MT1 in chronological order, that is, in the time order in which the source tracks identified by the metadata entries have been copied to the backup volume prior to being overwritten by update operations.

FIG. 6A is a table which illustrates an example of a chronological sequence of the metadata entries ME1, ME2 . . . ME10 of the metadata track MT1. In this example, three consistency groups are formed by the update logic 104 between various time versions of the source tracks of the source volume 54 and the backup volume 50 of the MPiT copy relationship R1. The three consistency groups of this example are consistency group CG1 representing the contents of the source volume 54 at 1:00 PM, consistency group CG2 representing the contents of the source volume 54 at 2:00 PM and consistency group CG3 representing the contents of the source volume 54 at 3:00 PM.

In the example of FIG. 6A, the first source track of the source volume 54 to be updated is source track SVT100 which is updated at 1:15 PM. Accordingly, the contents of source track SVT100 are copied by the update logic 104 over to backup volume track BVT1 of the backup volume 50 prior to the contents of the source track SVT100 being overwritten by the update operation. As a result, consistency group CG1 contains the 1:00 PM version of the contents of source track SVT100 prior to being overwritten at 1:15 PM and the 1:00 PM version of the contents of source track SVT100 are stored in the backup volume track BVT1 of the backup volume 50. This information is stored by metadata logic 108 in the first metadata track entry ME1 of the metadata track MT1 such that the contents of the metadata track entry ME1 includes the source track identification number of source volume track SVT100 and the backup volume track identification number of the backup volume track BV1 which contains the 1:00 PM version of the contents of the source track SVT100 as indicated by the table of FIG. 6A.

As previously mentioned, in the illustrated embodiment, each metadata track such as the metadata track MT1 of FIG. 5A, is a linked list of metadata entries in which the entries are linked by pointers P1-P9 to form a sequence of metadata entries. The sequence of metadata entries of a track may initially be placed in the metadata track MT1 in chronological order, that is, in the time order in which the source tracks identified by the metadata entries have been copied to the backup volume prior to being overwritten by update operations.

Accordingly, each time a metadata entry is generated and placed in a metadata track location, a cursor pointing to the current location in the metadata track may be incremented to point to the location of the next-in-sequence metadata track entry to be generated in the sequence of metadata track entries. In the example of FIG. 6A, a cursor initially pointing to the current metadata track location of metadata track entry ME1, may be incremented to point to the metadata track location for the next-in-sequence metadata track entry ME2. Accordingly, a pointer P1 (FIG. 5A) is stored in a pointer field of the metadata track entry ME1 pointing to the location of the next-in-sequence metadata entry ME2 as represented by the contents "ME2" (FIG. 6A) in the pointer field of the metadata entry ME1.

Thus, in one embodiment, the fields of each metadata entry may include a pointer which points to the next-in-sequence entry of the list of metadata entries of the track. It is appreciated that the number and type of fields within a metadata entry and the initial sequential structure, if any, of the metadata track, may vary depending upon the particular application.

As metadata entries are generated and placed in the metadata track MT1 in the volatile cache 26a for each of the copied source tracks, journal logic 110 is configured to create journal entries 34 (FIG. 3) corresponding to the generated STIDD metadata entries and store them in the nonvolatile cache 26b. The journal entries 34 are provided to permit the metadata tracks to be reconstructed in the event that the metadata tracks in the volatile cache 26a are lost due to a power loss, hardware or software failure or other failure before they can be safely destaged to the storage 10 by destage logic 112 as destaged metadata tracks 113 of the storage 10.

The next-in-sequence metadata entry ME2 is generated and placed in the metadata track MT1 in the volatile cache 26a in a manner similar to that described above in connection with metadata track entry ME1. Accordingly, in the example of FIG. 6A, the next source track of the source volume 54 to be updated is source track SVT50 which is updated at 1:20 PM. Accordingly, the contents of source track SVT50 are copied by metadata logic 108 over to backup volume track BVT2 of the backup volume 50 prior to the contents of the source track SVT50 being overwritten by the update operation. As a result, consistency group CG1 further contains the 1:00 PM version of the contents of source track SVT50 prior to being overwritten at 1:20 PM and the 1:00 PM version of the contents of source track SVT50 is stored in the backup volume track BVT2 of the backup volume 50. This information is stored in the second metadata track entry ME2 of the metadata track MT1 such that the contents of the metadata track entry ME2 includes the source track identification number of source volume track SVT50 and the backup volume track identification number of the backup volume track BVT2 which contains the 1:00 PM version of the contents of the source track SVT50 as indicated by the table of FIG. 6A.

A cursor pointing to the current metadata track location of metadata track entry ME2, may be incremented to point to the metadata track location for the next-in-sequence metadata track entry ME3. Accordingly, a pointer is stored in a pointer field of the metadata track entry ME2 pointing to the location of the next-in-sequence metadata entry ME3 as represented by the contents "ME3" in the pointer field of the metadata entry ME2.

The metadata entries ME3, ME4 . . . ME10 may be generated and placed in the metadata track MT1 in a similar manner as described above as source volume tracks SVT400, SVT30, SVT55, SVT40, SVT100, SVT50, SVT299, and SVT100 are updated at 1:50 PM, 2:15 PM, 2:20 PM, 2:30 PM, 2:45 PM, 3:20 PM, 3:40 PM and 3:55 PM, respectively. The contents of source volume tracks SVT400, SVT30, SVT55, SVT40, SVT100, SVT50, SVT299, and SVT100 prior to being updated at 1:50 PM, 2:15 PM, 2:20 PM, 2:30 PM, 2:45 PM, 3:20 PM, 3:40 PM and 3:55 PM, respectively, are copied to backup volume tracks BVT3, BVT4, BVT5, BVT6, BVT7, BVT8, BVT9 and BVT10, respectively.

As a result, consistency group CG1 further contains the 1:00 PM version of the contents of source track SVT400 prior to being overwritten at 1:50 PM and the 1:00 PM version of the contents of source track SVT400 is stored in the backup volume track BVT3 of the backup volume 50. This information is stored in the third metadata track entry ME3 of the metadata track MT1 such that the contents of the metadata track entry ME3 includes the source track identification number of source volume track SVT400 and the backup volume track identification number of the backup volume track BVT3 which contains the 1:00 PM version of the contents of the source track SVT400 as indicated by the table of FIG. 6A. A pointer P3 is stored in a pointer field of the metadata track entry ME3 pointing to the location of the next-in-sequence metadata entry ME4 as represented by the contents "ME4" in the pointer field of the metadata entry ME3.

Further, consistency group CG2 contains the 2:00 PM version of the contents of source tracks SVT30, SVT55, SVT40, and SVT100 prior to being overwritten at 2:15 PM, 2:20 PM, 2:30 PM and 2:45 PM, respectively, and the 2:00 PM versions of the contents of source tracks SVT30, SVT55, SVT40, and SVT100 are stored in the backup volume tracks BVT4, BVT5, BVT6 and BVT7, respectively of the backup volume 50. This information is stored in the metadata track entries ME4, ME5, ME6 and ME7, respectively, of the metadata track MT1 such that the contents of the metadata track entries ME4, ME5, ME6 and ME7 include the source track identification numbers of source volume tracks SVT30, SVT55, SVT40, and SVT100, respectively, and the backup volume track identification number of the backup volume tracks BVT4, BVT5, BVT6 and BVT7, respectively, which contain the 2:00 PM versions of the contents of the source tracks SVT30, SVT55, SVT40, and SVT100 as indicated by the table of FIG. 6A. A pointer P4, P5, P6 and P7 is stored in a pointer field of the metadata track entries ME4, IVIES, ME6 and ME7, respectively, pointing to the location of the next-in-sequence metadata entry ME5, ME6, ME7 and ME8, respectively, as represented by the contents "ME5", "ME6", "ME7" and "ME8", respectively, in the pointer field of the metadata entries ME4, ME5, ME6 and ME7.

Further, consistency group CG3 contains the 3:00 PM versions of the contents of source tracks SVT50, SVT299, and SVT100 prior to being overwritten at 3:20 PM, 3:40 PM, and 3:55 PM, respectively. The 3:00 PM versions of the contents of source tracks SVT50, SVT299, and SVT100 are stored in the backup volume tracks BVT8, BVT9 and BVT10, respectively, of the backup volume 50. This information is stored in the metadata track entries ME8, ME9 and ME10, respectively, of the metadata track MT1 such that the contents of the metadata track entries ME8, ME9 and ME10 include the source track identification numbers of source volume tracks SVT50, SVT299, and SVT100, respectively, and the backup volume track identification number of the backup volume tracks BVT8, BVT9 and BVT10, respectively, which contain the 3:00 PM versions of the contents of the source tracks SVT50, SVT299, and SVT100, respectively, as indicated by the table of FIG. 6A. A pointer P8, P9 is stored in a pointer field of the metadata track entries ME8, and ME9, respectively, pointing to the location of the next-in-sequence metadata entry ME9, and ME10, respectively, as represented by the contents "ME9", and "ME10", respectively, in the pointer field of the metadata entries ME8, and ME9. Metadata entry ME10 is the last metadata entry of the chronological sequence of the metadata entries in the example of FIG. 6A.

A recovery volume 114 (FIG. 4) may be generated for a particular consistency group using the metadata entries of the metadata track MT1 of FIG. 5A which has been destaged to the destaged metadata tracks 113 of the storage 10. However, it is appreciated that locating the particular backup volume track of the backup volume 50 containing the particular time version of a particular source track of the source volume may be time consuming, particularly if the metadata entries of the metadata track are ordered chronologically using known chronological sequence formats.

For example, a recovery volume 114 may be generated for consistency group CG2 which is directed to the 2:00 PM version of the source tracks of the source volume 54. To read the contents of 2:00 PM version of the source volume track SVT40, for example, the metadata entry directed to the 2:00 version of the source volume track SVT40, is located. In known recovery volume techniques, a known search routine begins at the first metadata entry of the metadata track MT1 (FIGS. 5A, 6A) and examines each metadata track entry in track location order until the metadata entry for the requested time version of the requested source volume track is located. Thus, in a search for the 2:00 PM version of the source volume track SVT40 (FIG. 6A), the metadata entries ME1, ME2, ME3, ME4, ME5, and MEG would be examined in track location order until the metadata track entry ME6 directed to the 2:00 PM version (consistency group CG2) is located. It is appreciated that in typical commercial installations, entries of the metadata tracks may number in the thousands or more. As a result, recovery volume operations may be very time consuming.

In one aspect of the present description, recovery logic 118 (FIG. 3) is configured to sort the contents of the metadata track entries of a metadata track as a function of source track identification number to provide a sorted list 119a (FIG. 4) of contents of metadata track entries, to permit the time version of a source track to be located more quickly and more efficiently in a search of metadata tracks. FIG. 7A shows an example of a sorted list 119a of contents of the metadata track entries ME1, ME2 ... ME10 being sorted by consistency group, and within each consistency group, by source track identification number. The contents of the metadata track entries may be sorted using any suitable sorting algorithm such as selection sort, bubble sort, etc. Although the example of FIG. 7A shows the contents sorted by increasing numbers, it is appreciated that other sequences such as sorts by decreasing values may be used, depending upon the particular application.

Thus, in a search for the 2:00 PM version of the source volume track SVT40, for example, an examination of contents of the first metadata track entry (ME2) of the first consistency group (CG1) of the sorted list 119a of FIG. 7A, immediately reveals without the need to examine the contents of any more metadata track entries of that consistency group, that a metadata track entry for the source volume track SVT40 is not present in the metadata track entries for consistency group CG1. More specifically, the source volume track identification number of the metadata track entry ME2 is SVT50, a higher source track identification number than the source track identification number SVT40 of the search. Because the metadata track entries of each consistency group have been sorted by source track identification number, it may be concluded without examining the contents of any further metadata track entries of the consistency group CG1 that all metadata track entries of the consistency group CG1 have a higher source track identification number than the source track identification number SVT40, the source track identification number of the search. Accordingly, it may be concluded without examining contents of any further metadata track entries of the consistency group CG1 that the metadata track entry for the source track identification number SVT40 is not present in the metadata track entries of the consistency group CG1 of FIG. 7A.

As a result, the search by the recovery logic 118 can skip to the next consistency group, that is, consistency group CG2, and examine contents of the first entry, that is, metadata track entry ME4, of the consistency group CG2. The source volume track identification number of the metadata track entry ME4 is SVT30, a lower source track identification number than the source track identification number SVT40 of the search. Because the contents of the metadata track entries of each consistency group have been sorted in the list 119a by source track identification number, it may not be concluded without examining the contents of further metadata track entries of the consistency group CG2, whether or not the metadata track entry for the source track identification number SVT40 is present in the metadata track entries of the consistency group CG2 of FIG. 7A. Accordingly, the next-in-sequence metadata track entry MEG of the consistency group CG2 is examined. Here, the metadata track entry for the source track identification number SVT40 of the consistency group CG2 being searched for is located and identified as metadata track entry ME6. As a result, the data contents of the 2:00 PM version of source track identification number SVT40 may be located and read from backup volume track number BVT5 as indicated by the contents of metadata track entry ME6.

It is appreciated that metadata track entry sorting in accordance with the present description permits a metadata track entry for a particular source track identification number of a particular consistency group, to be located quickly and efficiently. Thus, in the example above for source track identification number SVT40 of consistency group CG2, the metadata track entry ME6 was located after examining just three metadata track entries, that is, metadata track entries ME2, ME4 and ME6 of the sorted list 119a. By comparison, using a known chronological ordering of metadata track entries, six metadata track entries ME1, ME2, ME3, ME4, ME5, and ME6 would be examined in track location order until the metadata track entry M6 directed to the 2:00 PM version (consistency group CG2) of metadata track identification SVT40 is located. In a commercial environment in which metadata tracks may contain thousands of entries, metadata track entry sorting in accordance with the present description may permit thousands of entries to be skipped in a search, significantly speeding the results of the search. Any suitable search algorithm may be used such as bubble search, binary search, etc.

As noted above, the recovery volume 114 (FIG. 4) may be generated for a particular consistency group, such as the consistency group CG2, for example, using the metadata entries of the metadata track MT1 of FIG. 5A which has been destaged to the destaged metadata tracks 113 of the storage 10. In addition, the sorted list 119a (FIG. 7A) may be generated to sort the contents of the metadata track entries ME1, ME2 ... ME10 by consistency group, and within each consistency group, by source track identification number. In another aspect of the present description, another sorted list 119b (FIG. 7B) may be generated which is directed to a particular recovery volume such as the recovery volume 114 for the consistency group CG2, for example. Thus, if the recovery volume is directed to a single time version such as the 2:00 PM version, for example, the sorted list 119b will be similarly limited to a single time version of the contents of source tracks stored in the backup volume of an MPiT relationship.

Accordingly, in the example above, the metadata track entry for the source track identification number SVT40 of the consistency group CG2 being searched for was located and identified as metadata track entry ME6. As a result, the data contents of the 2:00 PM version of source track identification number SVT40 may be located and read from backup volume track number BVT6 as indicated by the contents of metadata track entry ME6. In addition, contents of the metadata track entry ME6 may be added to the sorted list 119b (FIG. 7B) which is directed to just the recovery volume 114 for the consistency group CG2 which is directed to the 2:00 PM version of source tracks. Accordingly, the sorted list 119b may be generated when the recovery volume 114 is generated for the consistency group CG2 and the contents of the metadata entries for just the 2:00 PM version of consistency group CG2 may be sorted by source track identification number as shown in FIG. 7B.

As a result, the metadata entry ME6 for the source volume track SVT40 may be efficiently located in the sorted list 119b for the consistency group CG2 for the recovery volume 114 by examining just two entries, entry ME4 and ME6 in this example. Further, the data contents of the 2:00 PM version of source track identification number SVT40 may be located and read from backup volume track number BVT6 as indicated by the contents of metadata track entry ME6. Because the sorted list 119b is limited to a single time version of the source tracks stored in the backup volume of an MPiT relationship, a source track having that time version may be located more quickly as compared to the sorted list 119a which contains all or at least multiple time versions of the source tracks stored in the backup volume 50.

Thus, the sorted list 119b includes contents of the metadata entry ME7 for the 2:00 PM version (CG2) of the source track SVT100 for example, but excludes the contents of the metadata entry ME1 (FIG. 7A) for the 1:00 PM version (CG1) for the source track SVT100 of the sorted list 119a, and excludes the contents of the metadata entry ME10 (FIG. 7A) for the 3:00 PM version (CG3) for the source track SVT100 of the sorted list 119a. Accordingly, the sorted list 119b facilitates locating the backup volume track for a particular recovery volume directed to a particular time version of the source tracks of an MPiT relationship.

FIG. 8 depicts one example of operations of a storage manager 24 employing metadata track entry sorting in accordance with the present description. Although the storage manager 24 including the update logic 104, metadata logic 108, journal logic 110, destage logic 112 and recovery logic 118, is depicted in one embodiment as software in the memory 20 of the storage controller 4, it is appreciated that one or more of the components of the storage manager 24 may be implemented in whole or in part with hardware, software, firmware or any combination thereof.

In one embodiment of the storage manager 24, if a track of an MPiT source volume such as the MPiT source volume 54 is to be updated with new data, update logic 104 of the storage manager 24 first copies (block 204, FIG. 8) the data contents of the source track to be updated, to the MPiT backup volume 50 of the MPiT copy relationship R1 before the data contents of the source track is overwritten with the new data. In the illustrated embodiment, as the update logic 104 copies data tracks from the source volume 54 to the backup volume 50, the update logic 104 causes metadata logic 108 to generate (block 208) a track of source track identification descriptor (STIDD) metadata entries in a metadata track. Each metadata entry contains metadata for each copied track and is placed in a selected metadata track 30 in the volatile cache 26a.

As noted above, FIG. 5A depicts an example of a metadata track MT1 in which ten metadata tracks ME1, ME2 ... ME10 have been placed in response to the copying of ten source tracks at various times and in various consistency groups from the source volume 54 to the backup volume 50 of the MPiT copy relationship R1. Although the example of FIG. 5A depicts ten metadata entries in a metadata track for purposes of illustration, it is appreciated that a typical metadata track may have thousands or more such metadata track entries.

In the illustrated embodiment, each metadata track such as the metadata track MT1 of FIG. 5A, is a linked list of metadata entries in which the entries are linked by pointers P1-P9 to form a sequence of metadata entries. For example, a sequence of metadata entries of a track may initially be placed in the metadata track MT1 in chronological order, that is, in the time order in which the source tracks identified by the metadata entries have been copied to the backup volume prior to being overwritten by update operations.

As discussed above, FIG. 6A is a table which illustrates an example of a chronological sequence of the metadata entries ME1, ME2 ... ME10 of the metadata track MT1. In this example, three consistency groups are formed by the update logic 104 for various time versions of the source tracks of the source volume 54 copied to the backup volume 50 of the MPiT copy relationship R1. The three consistency groups of this example are consistency group CG1 representing the contents of the source volume 54 at 1:00 PM, consistency group CG2 representing the contents of the source volume 54 at 2:00 PM and consistency group CG3 representing the contents of the source volume 54 at 3:00 PM.

In one aspect of the present description, recovery logic 118 sorts (block 212, FIG. 8) contents of the metadata track entries of a metadata track such as the metadata track MT1, for example, as a function of source track identification number to permit a particular time version of a particular source track to be located more quickly and more efficiently in a search of the contents of a metadata track. As discussed above, FIG. 7A shows an example of a list of metadata track entries ME1, ME2 ... ME10 of FIG. 6A having been sorted in FIG. 7A by consistency group, and within each consistency group, by source track identification number. Recovery logic 118 may then generate (block 216, FIG. 8) a recovery volume for a consistency group based upon the sorted list 119a of FIG. 7A. In addition, recovery logic 118 may then generate (block 220, FIG. 8) a linked list 119b (FIG. 7B) for the recovery volume for a particular consistency group based upon the sorted list 119a of FIG. 7A.

For example, the recovery volume 114 of FIG. 4 may be generated for the consistency group CG2, for example, of the backup volume 50. As noted above, the actual data of a particular time version of the source volume 54 may not reside on the recovery volume 114 but instead may be located on tracks of the backup volume 50 or the source volume 54 itself.

Using the sorted list 119a to expedite the search, the metadata entries of the metadata track MT1 may be searched to locate a metadata entry for a particular source track which was generated for the particular time version of the particular source track. Because the metadata entry contents of the sorted list 119*a* have been sorted as a function of source track identification number, the particular time version of a particular source track may be identified more quickly and more efficiently.

If a metadata entry for the desired time version of the particular source track is found using the sorted list 119*a*, the metadata entry may be used to identify the track of the backup volume to which the particular time version of the particular source track was copied. The data may then be read from the identified backup volume track. Also, the contents of the located metadata track may be added to a sorted list of metadata contents just for a particular recovery volume for the particular consistency group. If a metadata entry for the time version of the source track is not found using the sorted list 119*a*, the data for the time version of the source track still resides on the original source track of the source volume 54 and may be read from that source track. It is appreciated that locating a metadata entry for a particular time version of a particular source track is significantly facilitated using a sorted list in accordance with the present description.

A sorted list of contents of metadata entries may be obtained using a variety of techniques. For example, the physical locations of metadata entries may be physically rearranged such that the physical order of the metadata entries are changed to sort the metadata entries as a function of source track identification numbers. Thus, the sequence of physical locations of the metadata entries ME1-ME10 of FIG. 5A may be rearranged to have a sequence of physical locations as depicted by the ordering of the list of metadata entries ME1-ME10 depicted for the sorted list 119*a* of FIG. 7A or the sorted list 119*b* of FIG. 7B.

Another technique is the use of links or pointers to order a list in a particular sequence. For example, the metadata entries ME1-ME10 of FIG. 5A are depicted as linked by pointers P1-P9 in a chronological sequence of metadata entries. The pointers L1-L9 of FIG. 5B may be substituted for the pointers P1-P9 of FIG. 5A to rearrange the logical sequence of the metadata entries ME1-ME10 to be sorted as a function of source track identification number as represented by the list 119*a* of FIG. 7A. Thus, in the linked list of FIG. 5B, the physical locations of the metadata entries ME1-ME10 remain unchanged as compared to the physical locations of the metadata entries ME1-ME10 in FIG. 5A, but the logical ordering of the metadata entries ME1-ME10 of FIG. 5B by the link pointers L1-L9 logically rearranges the sequence of the metadata entries as shown by the list 119*a* of FIG. 7A.

Figure 5B:
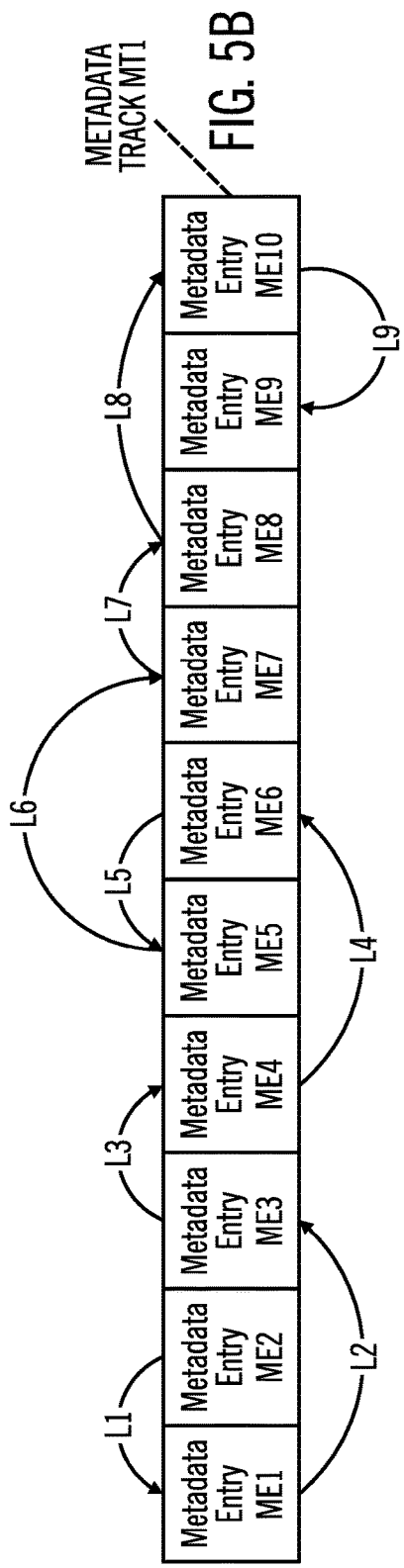
FIGS. 5B and 5C illustrate examples of linked entries of a metadata track which have been sorted in a manner employing metadata track entry sorting in accordance with one aspect of the present description.

In one embodiment, the link pointers L1-L9 of FIG. 5B may be stored in fields of the metadata entries as shown in FIG. 6B, for example. Accordingly, a pointer L1 is stored in a pointer field of the metadata track entry ME2 pointing to the location of the next-in-sequence metadata entry ME1 as represented by the contents "ME1" in the pointer field of the metadata entry ME2 of FIG. 6B. Similarly, a pointer L2 is stored in a pointer field of the metadata track entry ME1 pointing to the location of the next-in-sequence metadata entry ME3 as represented by the contents "ME3" in the pointer field of the metadata entry ME1. A pointer L3 is stored in a pointer field of the metadata track entry ME3 pointing to the location of the next-in-sequence metadata entry ME4 as represented by the contents "ME4" in the pointer field of the metadata entry ME3, and so on as depicted in FIGS. 5B and 6B.

In yet another technique, the linked list 119*a* may be in a data structure separate from the metadata entries of the metadata track. Thus, some or all of the content of the linked list 119*a* may be copied from the metadata track entries and supplemented with link pointers L1-L9 to logically link the metadata entries in a sequence sorted as a function of consistency group number and source track identification number in accordance with one embodiment of the present description.

Figure 5C:
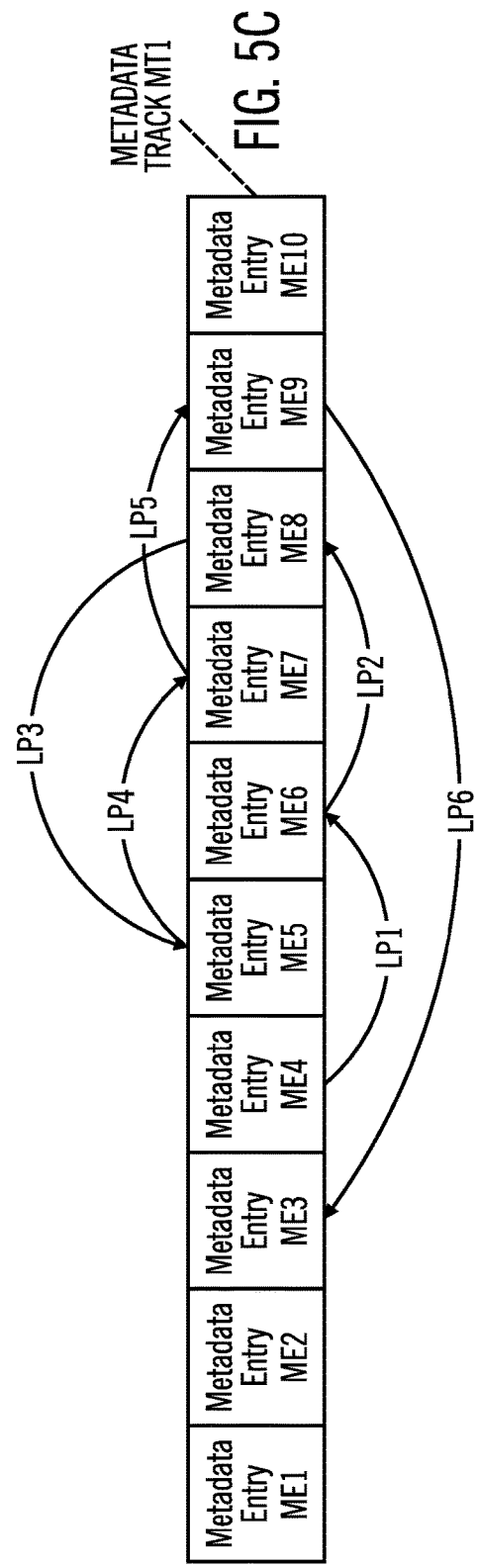

The sorted list 119*b* of FIG. 7*b* directed to a particular time version of source tracks of a particular recovery volume for a particular consistency group may also be generated by physically sorting entries or by use of link pointers, for example. FIG. 5C shows an example of metadata entries of metadata track MT1 being linked in the sequence of the list 119*b* of FIG. 7B by link pointers LP1-LP6, for example. The link pointers LP1-LP6 for the sorted list 119*b* may be stored in fields of the metadata entries themselves or in a separate data structures in various embodiments, for example. In this manner, the pointers of located metadata entries for the source tracks of a particular recovery volume having contents stored in the backup volume may be modified so that each entry of the sorted list 119*b* has a pointer identifying the next entry of the list 119*b* in a sorted sequence of entries limited to the particular point-in-time for the particular recovery volume and sorted by source data track identification for the particular point-in-time for the particular recovery volume.

Thus, metadata entries related to time versions of source tracks which do not match the time version of the source tracks of the list 119*b*, may be omitted from the list 119*b* to facilitate searches for metadata entries for source tracks having the matching time version value. As described below, if a source track of the recovery volume lacks a metadata track entry on the list 119*b* for a particular time version of that track, it may be determined that the time version of the source track matching the point-in-time value of the list 119*b* still resides on the source volume and may be obtained from the source volume track having the source track identification number.

FIGS. 9A and 9B depict further examples of operations of a storage manager 24 employing metadata track entry sorting in accordance with the present description. The operations of FIGS. 9A, 9B are directed to locating data tracks of a recovery volume such as the recovery volume 114 of FIG. 4 which has been generated for a particular consistency group such as the consistency group CG2, for example, of the backup volume 50. As noted above, the actual data of a particular time version of tracks of the source volume 54 may not reside on the recovery volume 114 but instead may be located on tracks of the backup volume 50 or the source volume 54 itself.

Accordingly, in response to, for example, receipt (block 254, FIG. 9) by the storage manager 24 of a read request to read a data track of the recovery volume 114 for the consistency group CG2, the sorted list 119*a* for the metadata entries of the metadata track MT1 may be searched (block 258, FIG. 9) by the recovery logic 118 to locate a metadata entry for a source track having a particular source track identification number, and which was generated for the particular time version (consistency group CG2 in this example) of the particular source track. Because the metadata entry contents of the sorted list 119*a* have been sorted as a function of source track identification number, the particular time version of a particular source track may be identified more quickly and more efficiently.

If a metadata entry for the desired time version of the particular source track is found using the sorted list 119*a*, the located metadata entry may be used to identify the track of the backup volume 50 to which the particular time version of the particular source track was copied. The data may then be read (block 262, FIG. 9) by the storage manager 24 from the identified backup volume track. If a metadata entry for the particular time version of the source track is not found using the sorted list 119a, the data for the source track still resides on the original source track of the source volume 54 and may be read from that source track. It is appreciated that locating a metadata entry for a particular time version of a particular source track is significantly facilitated using a sorted list in accordance with the present description.

FIG. 9B is directed to generating (block 274, FIG. 9B) the linked list 119b (FIG. 7B) for a recovery volume which has been generated for a particular time version or consistency group, such as the consistency group CG2 for the recovery volume 114. Upon initiating (block 274, FIG. 9B) generation of the linked list 119b, for each track of the recovery volume 114, the sorted list 119a for the metadata entries of the metadata track MT1 may be searched (block 278, FIG. 9) by the recovery logic 118 to locate a metadata entry for a source track having the particular source track identification number, and which was generated for the particular time version (consistency group CG2 in this example) of the particular source track. Because the metadata entry contents of the sorted list 119a have been sorted as a function of source track identification number, the particular time version of a particular source track may be identified more quickly and more efficiently.

If metadata entries for the desired time version of the particular source tracks are found using the sorted list 119a, the contents of the located metadata entries may be added (block 282, FIG. 9B) to the linked list 119b (FIG. 7B) and used to identify the tracks of the backup volume 50 to which the particular time version of the particular source tracks were copied. For example, the data may be read (block 262, FIG. 9A) by the storage manager 24 from the identified backup volume track. If a metadata entry for the time version of the source tracks of the recovery volume 114 are not found using the sorted list 119a such that the sorted list 119b lacks a metadata entry for a particular time version of a source track, the data for the source track still resides on the original source track of the source volume 54 and may be read from that source track. It is appreciated that locating a metadata entry for a particular time version of a particular source track is significantly facilitated using a sorted list in accordance with the present description.

Figure 10:
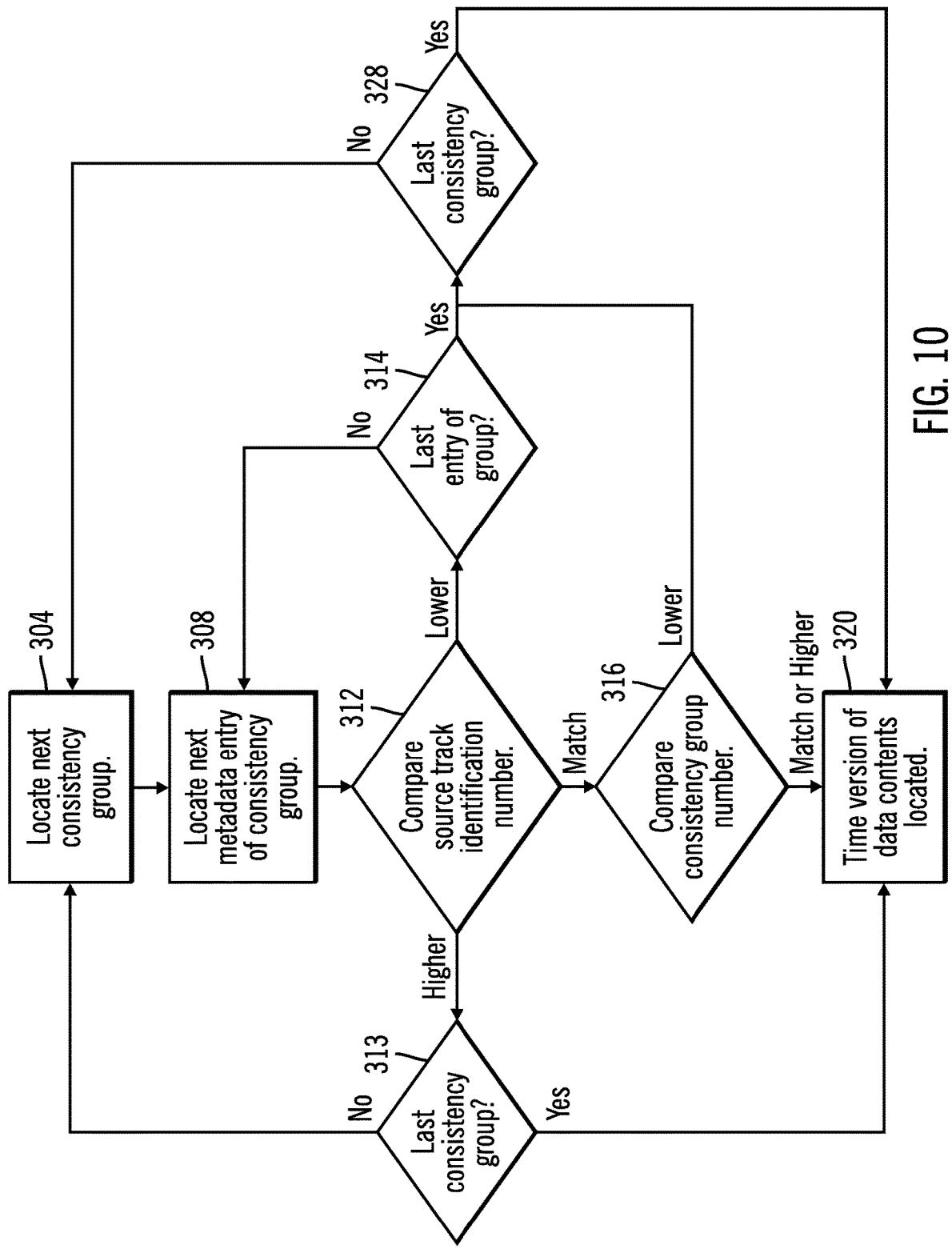
FIG. 10 is a more detailed example of operations of the storage controller of FIG. 3 employing metadata track entry sorting in accordance with one aspect of the present description.

FIG. 10 depicts another example of operations of a storage manager 24 employing metadata track entry sorting in accordance with the present description. The operations of FIG. 10 are directed to a more detailed example of the search operations of block 258 of FIG. 9A and block 278 of FIG. 9B in connection with the sorted list 119a of FIG. 7A for the metadata entries of the metadata track MT1 to locate a metadata entry for a source track having a particular source track identification number, and which was generated for a particular time version or consistency group of the particular source track.

In one example, a search may be conducted for the metadata entry for the source track having the source track identification number SVT40 and having a time version of 2:00 PM of the consistency group CG2. In this embodiment, the search is initialized by locating (block 304, FIG. 10) the first consistency group of the sorted list 119a of FIG. 7A which is consistency group CG1 in this example, and locating (block 308, FIG. 10) the first metadata entry of that consistency group which is metadata entry ME2 in this example.

The recovery logic 118 compares (block 312, FIG. 10) the source track identification number SVT50 of the metadata entry ME2 of the sorted list 119a to the source track identification number of the metadata entry being searched for, that is, SVT40. The source track identification number SVT50 of the metadata entry ME2 of the sorted list 119a is higher than that of the source track identification number SVT40 of the search. Accordingly, it is determined that the metadata entry being searched for is not in the current consistency group CG1 of the sorted list 119a. It is further determined (block 313, FIG. 10) that the current consistency group CG1 is not the last consistency group of the list 119a. Thus, the next consistency group of the sorted list 119a, that is, consistency group CG2 of the sorted list 119a of FIG. 7A is located (block 304, FIG. 10) and the first metadata entry of the sorted list 119a for the consistency group CG2 is located (block 308, FIG. 10), that is, metadata entry ME3.

The recovery logic 118 compares (block 312, FIG. 10) the source track identification number SVT30 of the metadata entry ME4 of the sorted list 119a to the source track identification number of the metadata entry being searched for, that is, SVT40. The source track identification number SVT30 of the metadata entry ME4 of the sorted list 119a is lower than that of the source track identification number SVT40 of the search. Accordingly, it is not yet determined whether or not the metadata entry being searched for is in the current consistency group CG2 of the sorted list 119a. The metadata entry ME4 is determined (block 314, FIG. 10) to not be the last entry of the consistency group CG2 of the sorted list 119a. Thus, the next metadata entry of the sorted list 119a for the consistency group CG2 is located (block 308, FIG. 10), that is, metadata entry ME6.

The recovery logic 118 compares (block 312, FIG. 10) the source track identification number SVT40 of the metadata entry ME6 of the sorted list 119a to the source track identification number of the metadata entry being searched for, that is, SVT40. The source track identification number SVT40 of the metadata entry ME6 of the sorted list 119a matches the source track identification number SVT40 of the search. Thus, the recovery logic 118 compares (block 316, FIG. 10) the current consistency group number of the sorted list 119a, that is, consistency group CG2, to the consistency group number of the searched for metadata entry. Since the source track identification number of the metadata entry ME6 of the sorted list 119a matches the source track identification number of the metadata entry being searched for, that is, SVT40, and the current consistency group number CG2 of the sorted list 119a matches (block 316) the consistency group number of the metadata entry being searched for, that is, consistency group CG2, it is determined that the metadata entry being searched for has been located as the metadata entry ME6. As a result, the contents of the 2:00 PM time version of the source track SVT40 has been located (block 320, FIG. 10) and the contents of the metadata entry ME6 may be added to the linked list 119b as shown in FIG. 7B. Alternatively, the contents of the 2:00 PM time version of the source track SVT40 may be read from backup volume track BVT6 as indicated by metadata track entry ME6. Thus, in this example, metadata entry ME6 of the sorted list 119a having the source data track identification SVT40 is located within the matching consistency group CG2 for the point-in-time value of 2:00 PM.

In another example, a search may be conducted for the metadata entry for the source track having the source track identification number SVT50 and having a time version of 2:00 PM of the consistency group CG2. In this embodiment, the search is initialized by locating (block 304, FIG. 10) the first consistency group of the sorted list 119a of FIG. 7A which is consistency group CG1 in this example, and locating (block 308, FIG. 10) the first metadata entry of that consistency group which is metadata entry ME2.

The recovery logic 118 compares (block 312, FIG. 10) the source track identification number SVT50 of the metadata entry ME2 of the sorted list 119a to the source track identification number of the metadata entry being searched for, that is, SVT50. The source track identification number SVT50 of the metadata entry ME2 of the sorted list 119a matches that of the source track identification number SVT50 of the search. Accordingly, the recovery logic 118 compares (block 316, FIG. 10) the current consistency group number of the sorted list 119a, that is, consistency group CG1, to the consistency group number of the searched for metadata entry. Since the current consistency group number CG1 of the sorted list 119a is lower (block 316) than the consistency group number of the metadata entry being searched for, that is, consistency group CG2, it is determined that the metadata entry being searched for not been located and accordingly, the recovery logic 118 determines (block 328) whether the current consistency group of the sorted list 119a being searched is the last consistency group of the list 119a. Since the current consistency group CG1 being searched is not the last consistency group of the list 119a, the recover logic 118 locates (block 304, FIG. 10) the next consistency group of the sorted list 119a of FIG. 7A which is consistency group CG2 in this example, and locates (block 308, FIG. 10) the first metadata entry of that consistency group which is metadata entry ME4.

The recovery logic 118 compares (block 312, FIG. 10) the source track identification number SVT30 of the metadata entry ME4 of the sorted list 119a to the source track identification number of the metadata entry being searched for, that is, SVT50. The source track identification number SVT30 of the metadata entry ME4 of the sorted list 119a is lower than that of the source track identification number SVT50 of the search. Accordingly, it is not yet determined whether or not the metadata entry being searched for is in the current consistency group CG2 of the sorted list 119a. The metadata entry ME4 is determined (block 314, FIG. 10) to not be the last entry of the consistency group CG2 of the sorted list 119a and the next metadata entry of the sorted list 119a for the consistency group CG2 is located (block 308, FIG. 10), that is, metadata entry MEG.

The recovery logic 118 compares (block 312, FIG. 10) the source track identification number of the metadata entry ME6 of the sorted list 119a to the source track identification number of the metadata entry being searched for, that is, SVT50. The source track identification number SVT40 of the metadata entry ME6 of the sorted list 119a is lower than that of the source track identification number SVT50 of the search. Accordingly, it is not yet determined whether or not the metadata entry being searched for is in the current consistency group CG2 of the sorted list 119a. The metadata entry ME6 is determined (block 314, FIG. 10) to not be the last entry of the consistency group CG2 of the sorted list 119a and the next metadata entry of the sorted list 119a for the consistency group CG2 is located (block 308, FIG. 10), that is, metadata entry ME5.

The recovery logic 118 compares (block 312, FIG. 10) the source track identification number SVT55 of the metadata entry ME5 of the sorted list 119a to the source track identification number of the metadata entry being searched for, that is, SVT50. The source track identification number SVT55 of the metadata entry ME5 of the sorted list 119a is higher than that of the source track identification number SVT50 of the search. Accordingly, it is determined that the metadata entry being searched for is not in the current consistency group CG2 of the sorted list 119a. It is further determined (block 313, FIG. 10) that the current consistency group CG2 being searched within the list 119a is not the last consistency group of the list 119a, and the next consistency group of the sorted list 119a, that is, consistency group CG3 of the sorted list 119a of FIG. 7A is located (block 304, FIG. 10) and the first metadata entry of the sorted list 119a for the consistency group CG3 is located (block 308, FIG. 10), that is, metadata entry ME8.

The recovery logic 118 compares (block 312, FIG. 10) the source track identification number SVT50 of the metadata entry ME8 of the sorted list 119a to the source track identification number of the metadata entry being searched for, that is, SVT50. The source track identification number SVT50 of the metadata entry ME8 of the sorted list 119a matches the source track identification number SVT50 of the search. Thus, the recovery logic 118 compares (block 316, FIG. 10) the current consistency group number of the sorted list 119a, that is, consistency group CG3, to the consistency group number of the searched for metadata entry. Since the source track identification number of the metadata entry ME8 of the sorted list 119a matches the source track identification number of the metadata entry being searched for, that is, SVT50, and the current consistency group number CG3 of the sorted list 119a is higher (block 316) than that of the consistency group number of the metadata entry being searched for, that is, consistency group CG2, it is determined that the metadata entry being searched for has been located as the metadata entry ME8. As a result, the contents of the 2:00 PM time version of the source track SVT50 have been located (block 320, FIG. 10) and the contents of the metadata entry ME8 may be added to the linked list 119b as shown in FIG. 7B. Alternatively, the contents of the metadata entry ME8 may be read from backup volume track BVT8 as indicated by metadata track entry ME8.

Thus, in this example, metadata entry ME8 of the sorted list 119a having the source data track identification SVT50 for the point-in-time value of 2:00 PM is located within the consistency group CG3 for the point-in-time value of 3:00 PM for the source track SVT50. In this example, the 3:00 PM version of the source track SVT50 is the same as the 2:00 PM version of the source track SVT50. Thus, in this example, metadata entry ME8 of the sorted list 119a having the source data track identification SVT50 for the point-in-time value of 2:00 PM is located within a consistency group (CG3) having the earliest associated point-in-time (3:00 PM) which is later than the associated point-in-time (2:00 PM) being searched for the source track SVT50.

In yet another example, a search may be conducted for a metadata entry for the source track having the source track identification number SVT400 and having a time version of 2:00 PM of the consistency group CG2. As indicated in FIG. 6A, the sorted list 119a has a single entry, metadata track entry ME3 for the source track identification SVT400, which is within consistency group CG1 having an associated point-in-time of 1:00 PM. Since the contents of the source track SVT400 did not change again after the update which caused the metadata entry ME3 to be generated, the 2:00 PM version of the source track SVT400 is the same as the updated version of the source track SVT400 which still resides on the source volume 54. Thus, the sorted list 119b may omit a metadata entry for the 2:00 PM version of the source track SVT400. Alternatively, an entry may be added to the list 119b to indicate that the 2:00 PM version of the source track SVT400 may be found at the source track SVT400 of the source volume.

It is seen from the above that locating a metadata entry of the sorted list 119*a* having a particular source data track identification for a source track of a particular point-in-time, includes locating a metadata entry of the sorted list 119*a* having the particular source data track identification within the consistency group having the earliest associated point-in-time which matches or is later than the particular point-in-time of the particular consistency group for a particular recovery volume. As a result, the contents of the time version of the source track is determined to have been located (block 320, FIG. 10) and the contents of the located metadata entry may be added to the sorted list 119*b* (FIG. 7B) or read from the backup volume track as indicated by the stored metadata track entry.

If the search of the sorted list 119*a* reaches (block 313 or block 328, FIG. 10) the last consistency group without locating a matching source track identification number within a consistency group having the earliest associated point-in-time which matches or is later than the particular point-in-time of the particular consistency group, it is determined that the particular time version of the particular source track being searched for still resides on the source volume. Alternatively, if the search of the sorted list 119*a* reaches (block 313 or block 328, FIG. 10) the last consistency group without locating any source track identification number matching the source track identification number of the metadata entry being searched for, it is determined that contents of the time version of the source track being searched for remains located (block 320, FIG. 10) on the source volume 54. As a result, the contents of the time version of the source track is determined to have been located (block 320, FIG. 10) and may be read from the source volume as indicated by the source volume track identification number. Since a metadata entry for the particular time version of the particular source track was not located, the contents of a metadata entry for the particular source track may omitted from the sorted list 119*b* (FIG. 7B) for a particular recovery volume. Alternatively an entry may be added to the sorted list 119*b* indicating that the contents of the particular time version of the particular source track may be located on the source volume.

It is appreciated that one or more data storage units of the storage 10, 10*a*, 10*b* may comprise any suitable device capable of storing data in a nonvolatile manner, such as hard drives, solid state drives, tape drives, etc., known in the art. Thus, in one embodiment, the storage 10, 10*a*, 10*b* may be comprised of one or more sequential access storage devices, such as hard disk drives and magnetic tape drives or may also include non-sequential access storage devices such as solid state drives (SSD), for example. Such additional devices of storage 10, 10*a*, 10*b* may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 10*a*, 10*b* may also be other types of storage such as solid state drives in a RAID configuration to facilitate data recovery in the event of loss of a solid state drive. The storage units of the storage 10*a*, 10*b* may be configured to store data in subunits of data storage such as volumes, tracks, etc.

The storage manager 24 (FIG. 2) in one embodiment stores data in the cache and transfers data between the cache and storage 10*a*, 10*b* (FIG. 1) in tracks. Similarly, the storage manager 24 (FIG. 2) in one embodiment transfers data from the primary storage 10*a* (FIG. 1) to a secondary storage 10*b* in tracks. As used herein in one embodiment, the term track refers to a subunit of data or storage of a disk storage unit, a solid state storage unit or other types of storage units. In addition to tracks, storage units may have other subunits of storage or data such as a bit, byte, word, segment, page, block (such as a Logical Block Address (LBA)), cylinder, segment, extent, volume, logical device, etc. or any portion thereof, or other subunits suitable for transfer or storage. Thus, as used herein, a segment is a subunit of a track. Accordingly, the size of subunits of data processed in input/output operations in accordance with the present description may vary, depending upon the particular application. Thus, as used herein, the term "track" or the term "segment" refers to any suitable subunit of data storage or transfer.

The system components 1*a* (FIG. 1), 1*b* . . . 1*n*, 4 (FIG. 2), 6 are connected to a network 6 which enables communication among these components. Thus, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1*a*, 1*b*, . . . 1*n* may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 11:
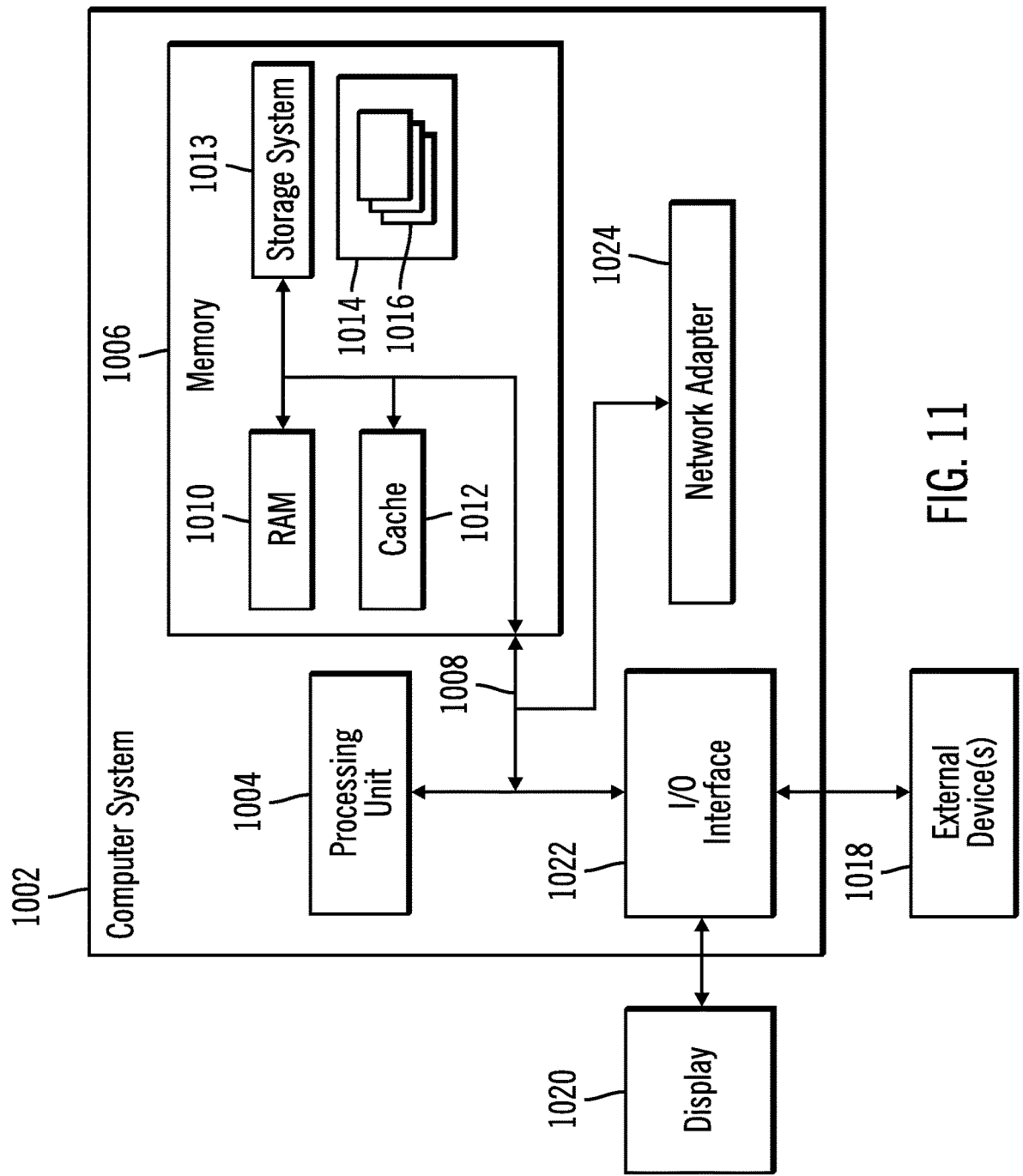
FIG. 11 illustrates a computer embodiment employing metadata track entry sorting in a data storage system in accordance with the present description.

The computational components of the figures may each be implemented in one or more computer systems, such as the computer system 1002 shown in FIG. 11. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with a data storage system having a storage controller and at least one storage unit controlled by the storage controller and configured to store data in volumes, wherein the storage controller has a processor and a cache, and wherein the computer program product comprises a computer readable storage medium having program instructions embodied therewith, the program instructions executable by a processor of the storage controller to cause storage controller processor operations, the storage controller processor operations comprising:

copying a plurality of source data tracks from a source volume and storing the plurality of copied data tracks in a plurality of target data tracks of a backup volume;

generating a first list of source track identification descriptor (STIDD) metadata entries for the plurality of copied source data tracks stored in the plurality of target data tracks of the backup volume, each metadata entry identifying a source data track copied from the source volume and an associated target data track of the backup volume in which the source data track is stored;

sorting the first list of metadata entries as a function of the source data track identification of each metadata entry to provide a second list of metadata entries in which the second list of metadata entries is a sorted list of metadata entries; and generating a recovery volume which includes data tracks which are a function of one or more data target tracks identified by the sorted list of metadata entries.

2. The computer program product of claim 1 wherein the first list of metadata entries includes a consistency group identification of a consistency group to which a source data track and its associated target data track of each metadata entry belongs, and wherein the sorting the first list of metadata entries includes sorting the first list of metadata entries as a function of a source data track identification within each consistency group identification.

3. The computer program product of claim 2 wherein each consistency group represents the source volume at an associated point-in-time value and wherein the generating a recovery volume includes generating a first recovery volume for a first consistency group having an associated first point-in-time value representing the source volume as of the first point-in-time value, and wherein the storage controller processor operations further comprise:

reading from the first recovery volume a first data track representing a first recovered source data track having a first source data track identification.

4. The computer program product of claim 3 wherein the reading the first data track includes locating a metadata entry of the sorted list having the first source data track identification for the first point-in-time value and reading the target data track identified by the located metadata entry having the first source data track identification for the first point-in-time value.

5. The computer program product of claim 4 wherein the locating a metadata entry of the sorted list having the first source data track identification for the first point-in-time value includes locating a metadata entry of the sorted list having the first source data track identification and is also within a consistency group having the earliest associated point-in-time which is one of:

a) matching the first point-in-time value, and
b) later than the first point-in-time value,
for the first source data track identification.

6. The computer program product of claim 2 wherein the first list of metadata entries is a linked list in which each entry has a pointer identifying the next entry of the linked list in a first sequence of entries sorted by consistency group identification.

7. The computer program product of claim 6 wherein the sorting the first list of metadata entries as a function of a source data track identification within each consistency group identification includes modifying the pointers of the metadata entries of each consistency group so that each entry has a pointer identifying the next entry of the linked list in a second sequence of entries sorted by consistency group identification and by source data track identification within each consistency group identification.

8. The computer program product of claim 7 wherein the storage controller processor operations further comprise sorting the second list of metadata entries as a function of a source data track identification of metadata entries to provide a third list of metadata entries for a particular recovery volume limited to a particular point-in-time of a particular consistency group, wherein the sorting for the third list includes:

for each source track of the particular recovery volume having contents stored in the backup volume, locating a metadata entry of the second list having a particular source data track identification and within a consistency group having the earliest associated point-in-time which matches or is later than the particular point-in-time value for the particular recovery volume; and modifying the pointers of the located metadata entries for the source tracks of the particular recovery volume having contents stored in the backup volume so that each entry of the third list has a pointer identifying the next entry of the third list in a third sequence of entries limited to the particular point-in-time for the particular recovery volume and sorted by source data track identification for the particular point-in-time for the particular recovery volume.

9. A system, comprising:

a data storage system having a storage controller and at least one storage unit controlled by the storage controller and configured to store data in volumes, wherein the storage controller has a processor and a cache; and a computer program product comprising a computer readable storage medium having program instructions embodied therewith, the program instructions executable by a processor of the storage controller to cause storage controller processor operations, the storage controller processor operations comprising:

copying a plurality of source data tracks from a source volume and storing the plurality of copied data tracks in a plurality of target data tracks of a backup volume;

generating a first list of source track identification descriptor (STIDD) metadata entries for the plurality of copied source data tracks stored in the plurality of target data tracks of the backup volume, each metadata entry identifying a source data track copied from the source volume and an associated target data track of the backup volume in which the source data track is stored;

sorting the first list of metadata entries as a function of the source data track identification of each metadata entry to provide a second list of metadata entries in which the second list of metadata entries is a sorted list of metadata entries; and generating a recovery volume which includes data tracks which are a function of one or more data target tracks identified by the sorted list of metadata entries.

10. The system of claim 9 wherein the first list of metadata entries includes a consistency group identification of a consistency group to which a source data track and its associated target data track of each metadata entry belongs, and wherein the sorting the first list of metadata entries includes sorting the first list of metadata entries as a function of a source data track identification within each consistency group identification.

11. The system of claim 10 wherein each consistency group represents the source volume at an associated point-in-time value and wherein the generating a recovery volume includes generating a first recovery volume for a first consistency group having an associated first point-in-time value representing the source volume as of the first point-in-time value, and wherein the storage controller processor operations further comprise:

reading from the first recovery volume a first data track representing a first recovered source data track having a first source data track identification.

12. The system of claim 11 wherein the reading the first data track includes locating a metadata entry of the sorted list having the first source data track identification for the first point-in-time value and reading the target data track identified by the located metadata entry having the first source data track identification for the first point-in-time value.

13. The system of claim 12 wherein the locating a metadata entry of the sorted list having the first source data track identification for the first point-in-time value includes locating a metadata entry of the sorted list having the first source data track identification and is also within a consistency group having the earliest associated point-in-time which is one of:

a) matching the first point-in-time value, and
b) later than the first point-in-time value, for the first source data track identification.

14. The system of claim 10 wherein the first list of metadata entries is a linked list in which each entry has a pointer identifying the next entry of the linked list in a first sequence of entries sorted by consistency group identification.

15. The system of claim 14 wherein the sorting the first list of metadata entries as a function of a source data track identification within each consistency group identification includes modifying the pointers of the metadata entries of each consistency group so that each entry has a pointer identifying the next entry of the linked list in a second sequence of entries sorted by consistency group identification and by source data track identification within each consistency group identification.

16. The system of claim 15 wherein the storage controller processor operations further comprise sorting the second list of metadata entries as a function of a source data track identification of metadata entries to provide a third list of metadata entries for a particular recovery volume limited to a particular point-in-time of a particular consistency group, wherein the sorting for the third list includes:

for each source track of the particular recovery volume having contents stored in the backup volume, locating a metadata entry of the second list having a particular source data track identification and within a consistency group having the earliest associated point-in-time which matches or is later than the particular point-in-time value for the particular recovery volume; and modifying the pointers of the located metadata entries for the source tracks of the particular recovery volume having contents stored in the backup volume so that each entry of the third list has a pointer identifying the next entry of the third list in a third sequence of entries limited to the particular point-in-time for the particular recovery volume and sorted by source data track identification for the particular point-in-time for the particular recovery volume.

17. A method, comprising:

copying a plurality of source data tracks from a source volume and storing the plurality of copied data tracks in a plurality of target data tracks of a backup volume;

generating a first list of source track identification descriptor (STIDD) metadata entries for the plurality of copied source data tracks stored in the plurality of target data tracks of the backup volume, each metadata entry identifying a source data track copied from the source volume and an associated target data track of the backup volume in which the source data track is stored;

sorting the first list of metadata entries as a function of the source data track identification of each metadata entry to provide a second list of metadata entries in which the second list of metadata entries is a sorted list of metadata entries; and generating a recovery volume which includes data tracks which are a function of one or more data target tracks identified by the sorted list of metadata entries.

18. The method of claim 17 wherein the first list of metadata entries includes a consistency group identification of a consistency group to which a source data track and its associated target data track of each metadata entry belongs, and wherein the sorting the first list of metadata entries includes sorting the first list of metadata entries as a function of a source data track identification within each consistency group identification.

19. The method of claim 18 wherein each consistency group represents the source volume at an associated point-in-time value and wherein the generating a recovery volume includes generating a first recovery volume for a first consistency group having an associated first point-in-time value representing the source volume as of the first point-in-time value, the method further comprising:

reading from the first recovery volume a first data track representing a first recovered source data track having a first source data track identification.

20. The method of claim 19 wherein the reading the first data track includes locating a metadata entry of the sorted list having the first source data track identification for the first point-in-time value and reading the target data track identified by the located metadata entry having the first source data track identification for the first point-in-time value.

21. The method of claim 20 wherein the locating a metadata entry of the sorted list having the first source data track identification for the first point-in-time value includes locating a metadata entry of the sorted list having the first source data track identification and is also within a consistency group having the earliest associated point-in-time which is one of:

a) matching the first point-in-time value, and
b) later than the first point-in-time value for the first source data track identification.

22. The method of claim 18 wherein the first list of metadata entries is a linked list in which each entry has a pointer identifying the next entry of the linked list in a first sequence of entries sorted by consistency group identification.

23. The method of claim 22 wherein the sorting the first list of metadata entries as a function of a source data track identification within each consistency group identification includes modifying the pointers of the metadata entries of each consistency group so that each entry has a pointer identifying the next entry of the linked list in a second sequence of entries sorted by consistency group identification and by source data track identification within each consistency group identification.

24. The method of claim 23 further comprising sorting the second list of metadata entries as a function of a source data track identification of metadata entries to provide a third list of metadata entries for a particular recovery volume limited to a particular point-in-time of a particular consistency group, wherein the sorting for the third list includes:
  for each source track of the particular recovery volume having contents stored in the backup volume, locating a metadata entry of the second list having a particular source data track identification and within a consistency group having the earliest associated point-in-time which matches or is later than the particular point-in-time value for the particular recovery volume; and
  modifying the pointers of the located metadata entries for the source tracks of the particular recovery volume having contents stored in the backup volume so that each entry of the third list has a pointer identifying the next entry of the third list in a third sequence of entries limited to the particular point-in-time for the particular recovery volume and sorted by source data track identification for the particular point-in-time for the particular recovery volume.

* * * * *